United States Patent [19]

Scott et al.

[11] 4,376,706

[45] Mar. 15, 1983

[54] CHROMIUM AND ZINC REMOVAL AND RECOVERY BY ION EXCHANGE

[75] Inventors: Terrence I. Scott, Mississauga; Vincent H. Westlake; Michael K. Bridle, both of Calgary, all of Canada

[73] Assignee: Petro-Metals Recovery Systems Limited, Toronto, Canada

[21] Appl. No.: 216,271

[22] Filed: Dec. 15, 1980

Related U.S. Application Data

[63] Continuation of Ser. No. 26,323, Apr. 2, 1979, abandoned.

[51] Int. Cl.³ .............................................. C02F 1/42
[52] U.S. Cl. .................................... 210/678; 210/684; 210/686; 210/688; 423/54; 423/100
[58] Field of Search .................... 521/26, 31; 210/670, 210/678, 684, 686, 688, 263, 269, 275, 290; 423/54, 100

[56] References Cited

U.S. PATENT DOCUMENTS

| | | | |
|---|---|---|---|
| 2,844,546 | 7/1958 | Abrams | 521/31 |
| 3,527,718 | 9/1970 | Coburn | 210/686 |
| 4,036,751 | 7/1977 | Orita et al. | 210/684 |
| 4,057,494 | 11/1977 | Chopra | 210/684 |

Primary Examiner—Ivars C. Cintins
Attorney, Agent, or Firm—Ivor M. Hughes

[57] ABSTRACT

In the removal of chromium and zinc, the combination of an anion exchange resin and cation exchange resin in a single vessel, the anion exchange resin being selective of chromium in its chromate and dichromate ionic forms, and the cation exchange resin being an intermediate acid cation exchange resin with a phosphonic acid functional group on a cross-linked polystyrene matrix, having the repeating structural formula:

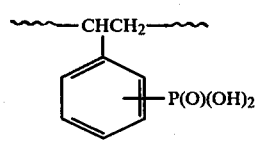

selective of zinc in its ionic form, said single vessel, having distributors selected from the group of inlet distributors, regenerant distributors, subsurface washers, collectors, disposed therein, and inlets and outlets for the addition or removal of effluent, water and regenerant.

35 Claims, 19 Drawing Figures

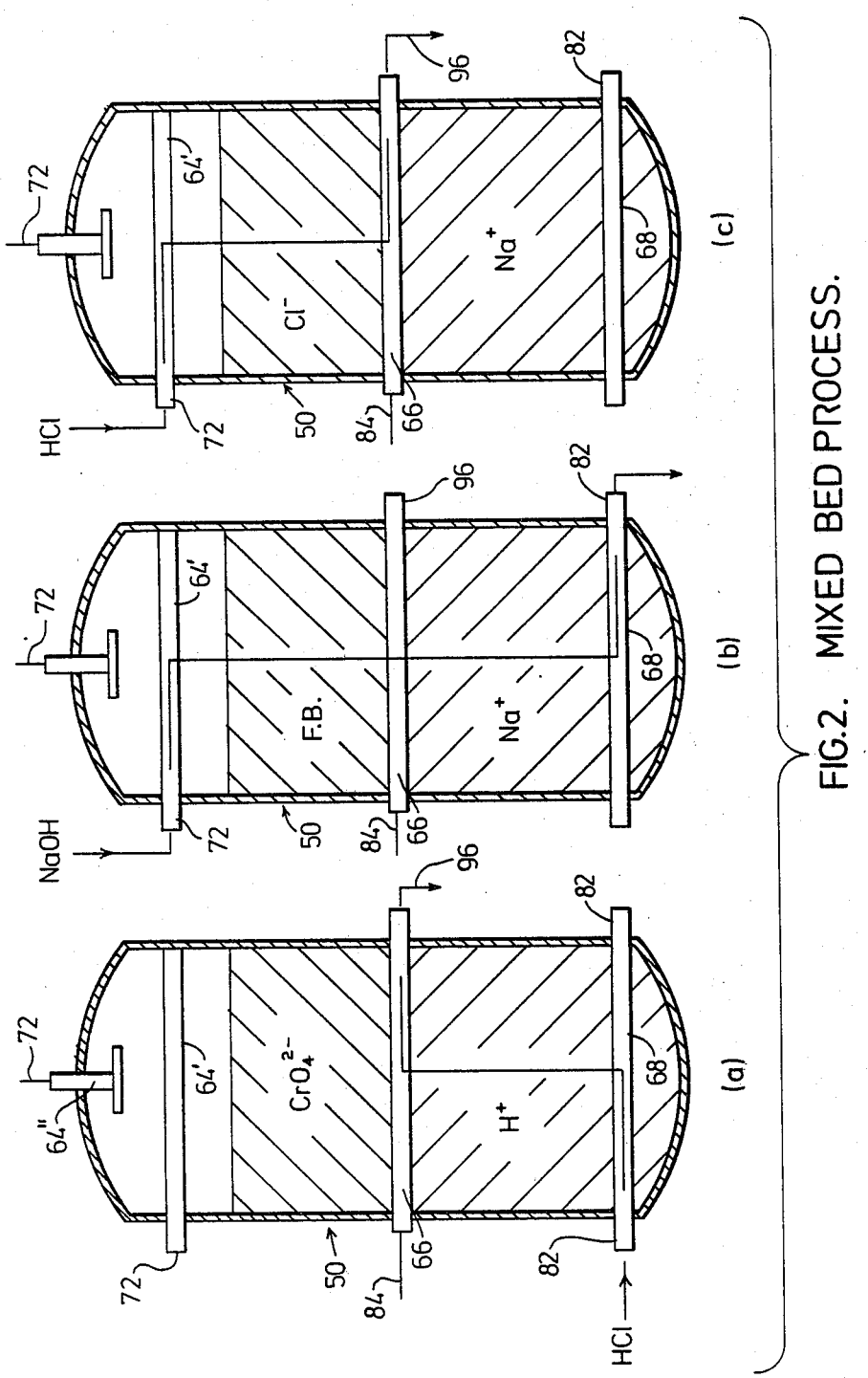
FIG.2. MIXED BED PROCESS.

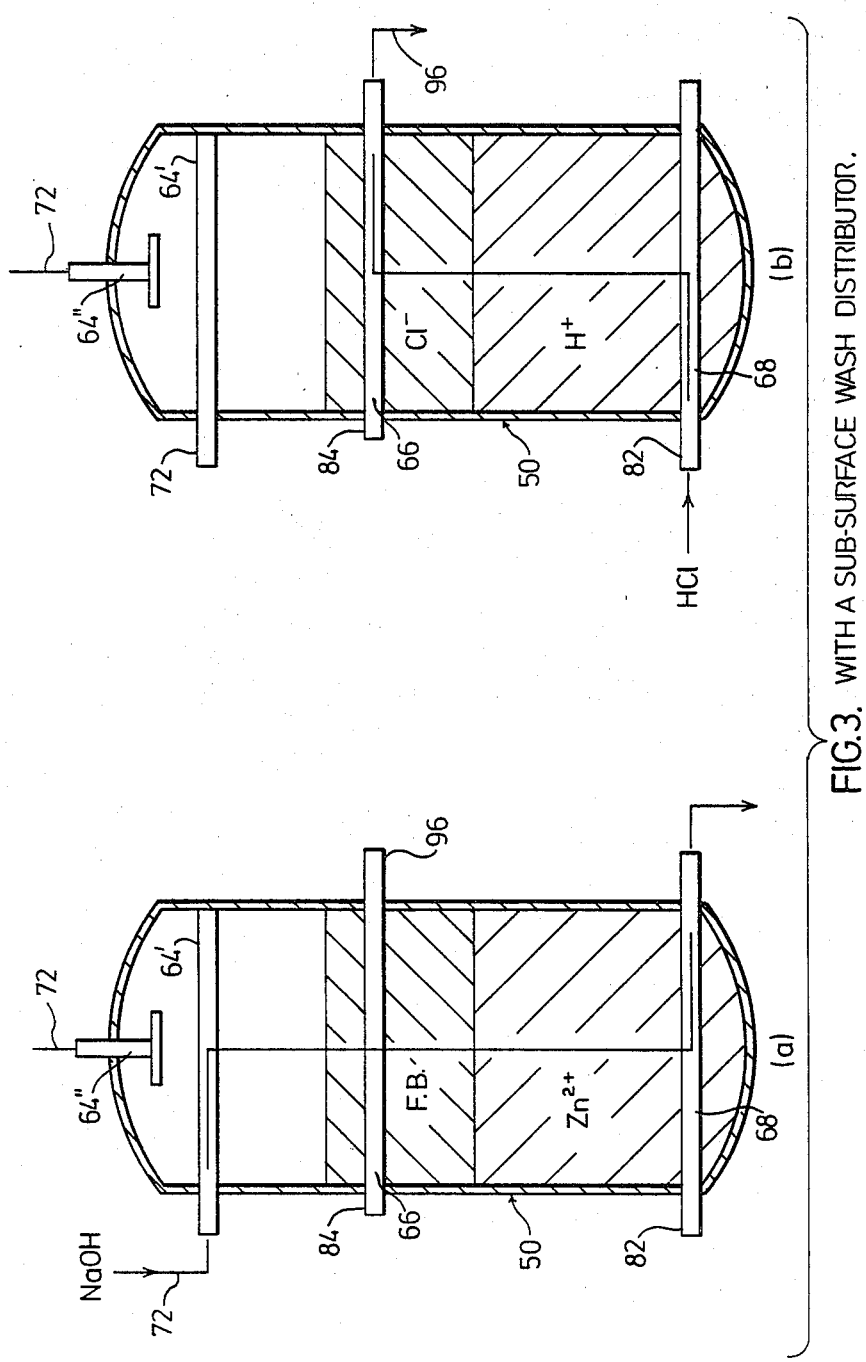
FIG.3. WITH A SUB-SURFACE WASH DISTRIBUTOR.

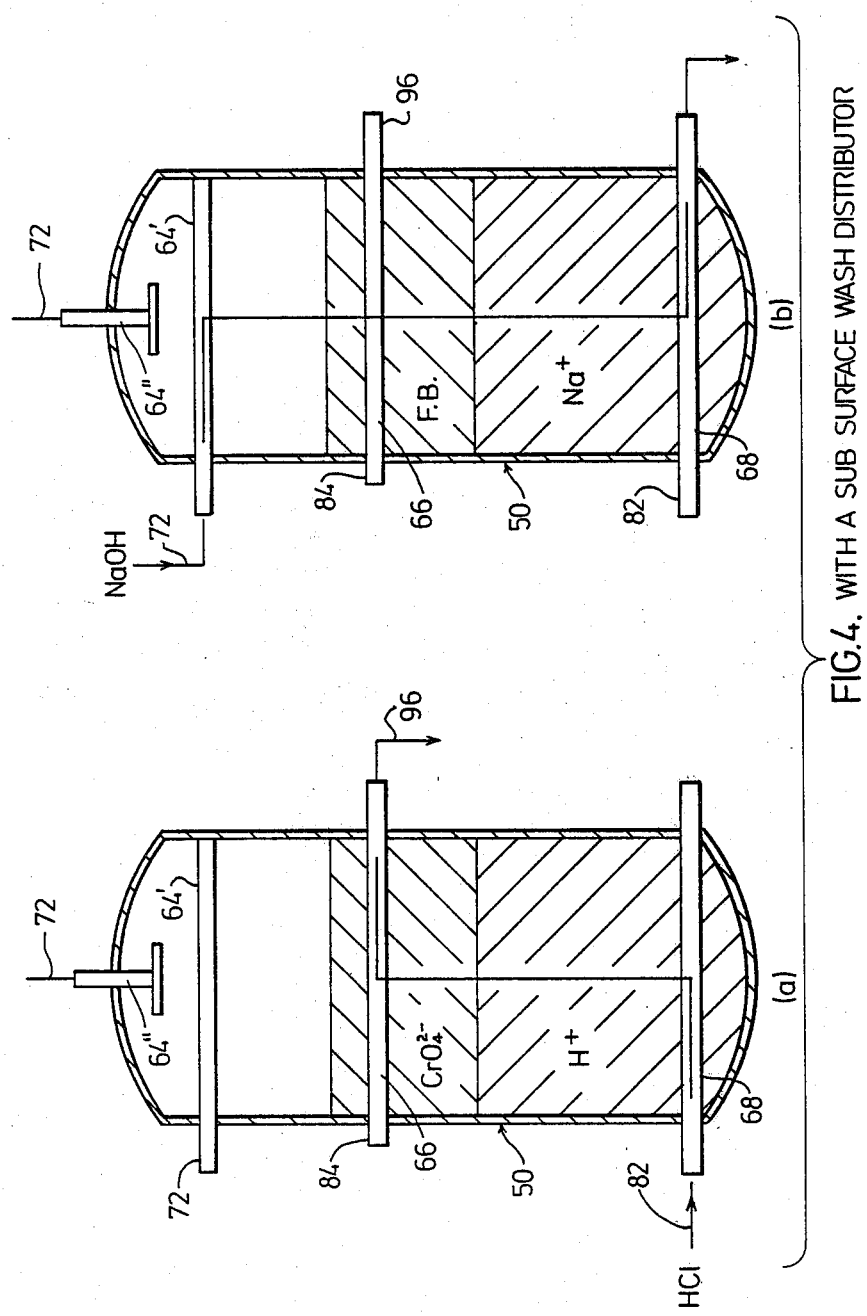
FIG.4. WITH A SUB SURFACE WASH DISTRIBUTOR

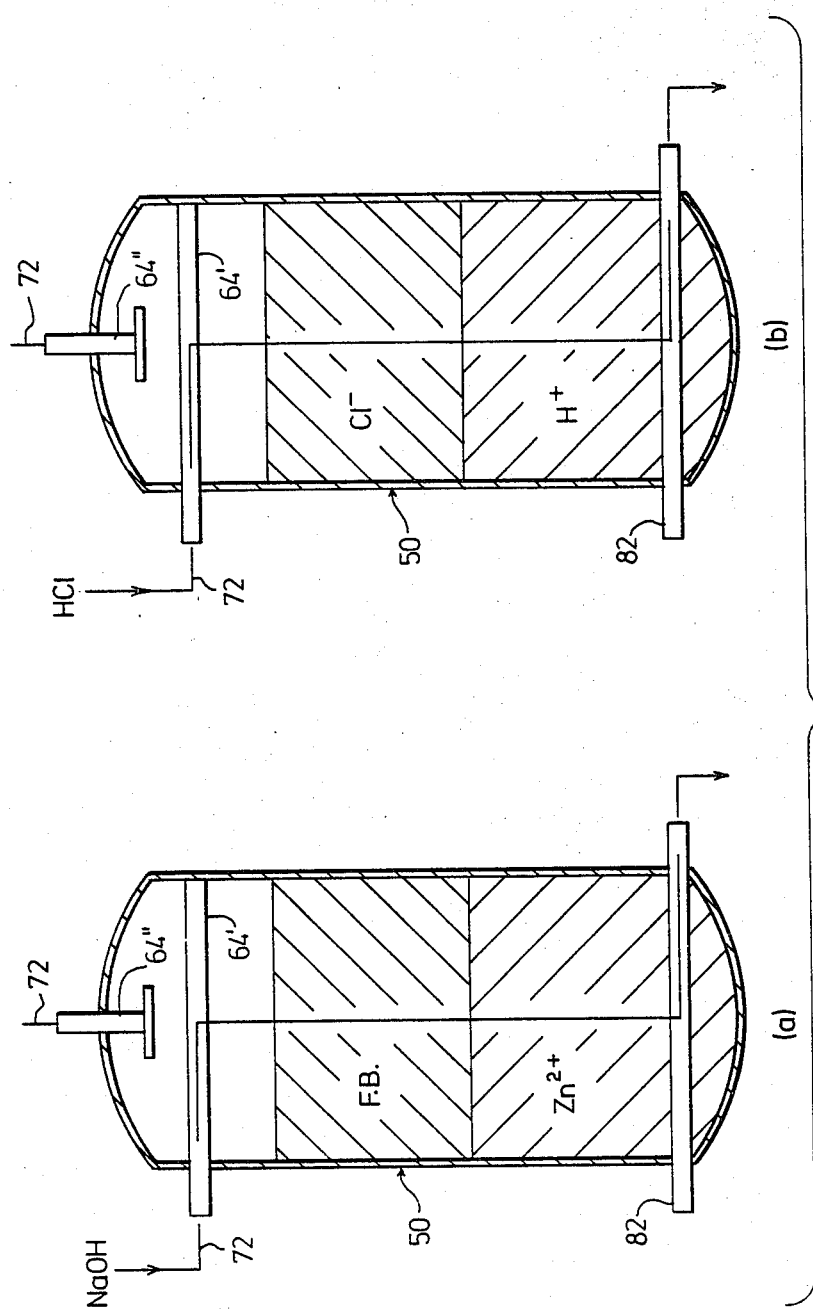
FIG. 5. WITHOUT THE USE OF A SUB-SURFACE WASH DISTRIBUTOR.

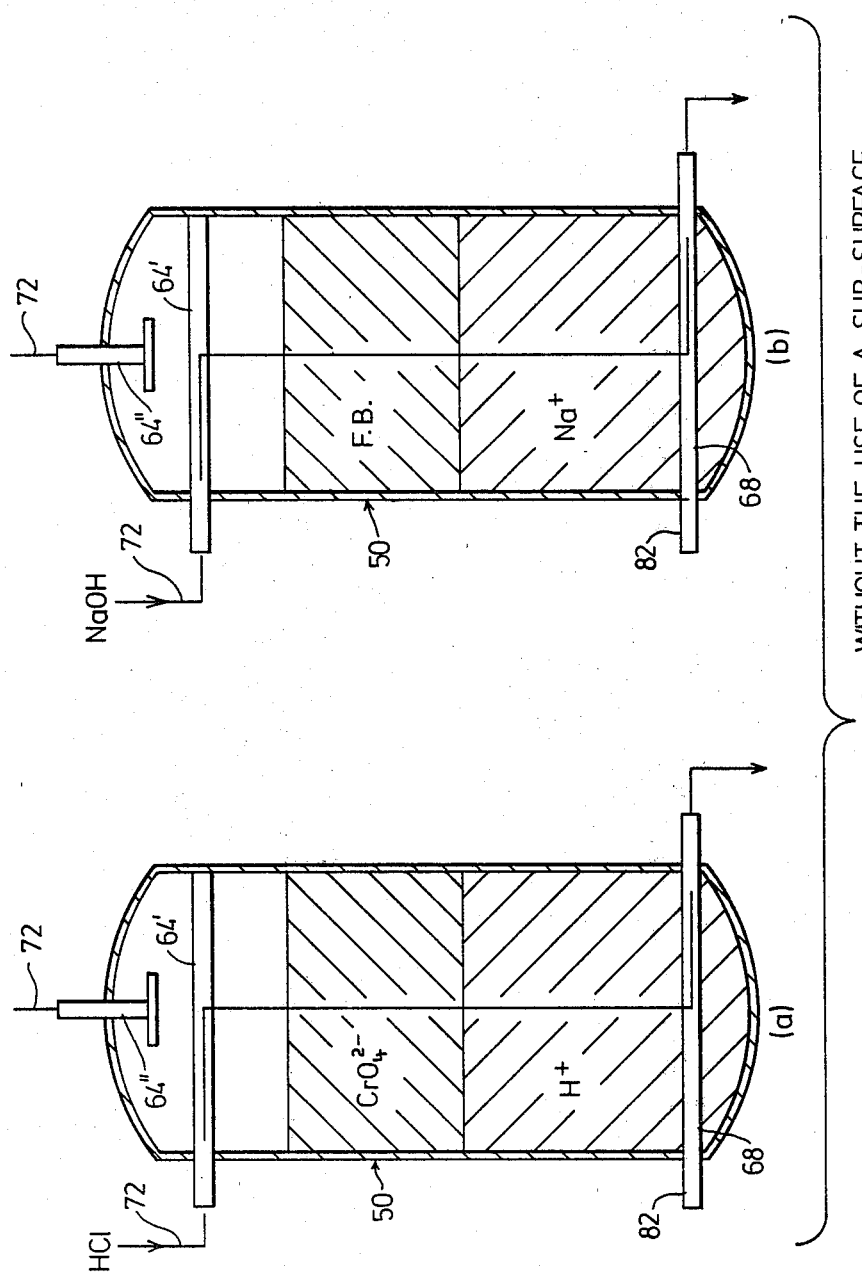
FIG. 6. WITHOUT THE USE OF A SUB-SURFACE WASH DISTRIBUTOR.

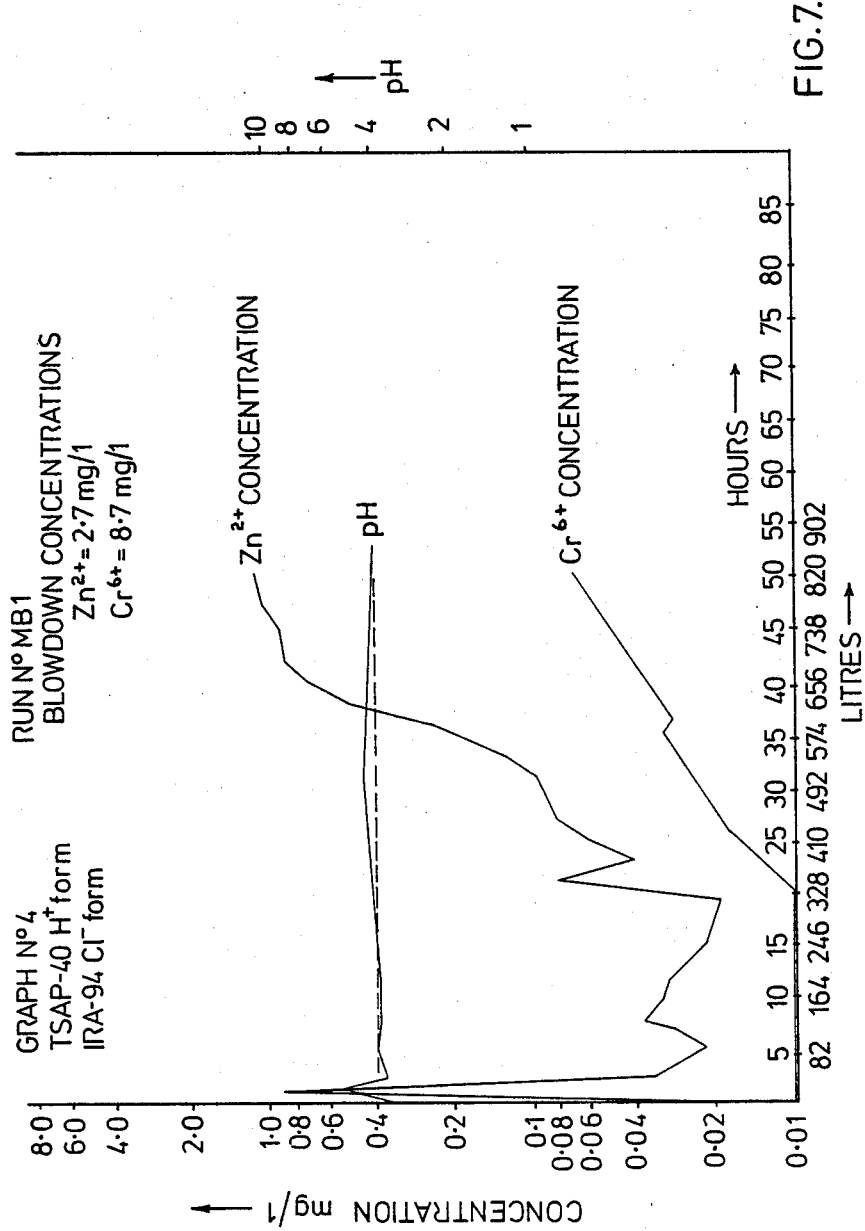

CHROMIUM AND ZINC REMOVAL AND RECOVERY BY ION EXCHANGE

This is a continuation of the application Ser. No. 26,323 filed Apr. 2, 1979, now abandoned.

FIELD OF INVENTION

This invention relates to the selective removal from effluent of zinc in its ionic form and chromium in its chromate and dichromate ionic forms in the same vessel by ion exchange and finds particular application to the removal of zinc and chromium from cooling tower blowdown.

BACKGROUND OF THE INVENTION

The process of removing heat from an aqueous solution is known as "cooling". One method of removing this heat is by the application of heat exchangers and forced evaporative structures, known as cooling towers, in series with one another. The transport vehicle is generally water. As this water is recirculated, it concentrates due to the evaporative nature of the process and consequently, produces undesirous side effects in the associated pipes, pumps, and heat exchangers. These deleterious side effects are corrosion, scaling and fouling. To combat this effect, chemicals are added to the system.

Three of the most widely added chemicals as corrosion inhibitors are chromium in its chromate and dichromate ionic forms, zinc in its ionic form, and phosphates, the chromates and zinc being toxic in high concentrations. While each of these added alone, act as a corrosion inhibitor, each must be added in high concentrations to be effective. In particular, zinc in its ionic form, should be added in concentrations of between about 1 ppm. and about 5 ppm. However, because to date, both selective removal of zinc and effective treatment of the effluent to meet environmental regulations in relation to the zinc discharged into the natural waterways, only about 1 ppm. of zinc in its ionic form is added to the cooling water.

When these chemicals are mixed however they synergistically enhance each other and enable lower concentrations to be used. This fact is important from both economic and environmental considerations. Of the three possible combinations of these chemicals, the most effective is believed to be the combination of zinc and chromium in its chromate and dichromate forms, rapid establishment of protection being characteristic of the zinc, but durability being provided by the chromate. When mixed, the chromates and zinc synergistically enhance each other, the combination being most effective at a ratio of $[Cr^{6+}]$ in the chromates:$[Zn^{2+}]$ of between about 3:1 and about 4:1 by weight. For good corrosion control, between about 12 ppm. and about 15 ppm. of $Cr^{6+}$ is preferred. Consequently, at least about 3 ppm of $Zn^{2+}$ is required for good corrosion inhibition. Once again, environmental regulations preclude their effective use.

If therefore, greater concentrations of zinc and chromium are to be employed, and together, to provide effective corrosion inhibition, these materials must be recovered—from a cost point of view, these materials are lost if discharged and from an environmental point of view, they would cause irreparable damage to the ecological balance.

Three possible routes exist for their removal.

1. chemical reduction or precipitation;
2. electrochemical reduction and precipitation;
3. ion exchange.

Of the three, ion exchange is the only method where the zinc and chromium are recovered in a form directly reusable in the system from which they were removed. It is also the area to which this invention relates.

Most anion exchange resins exhibit excellent selectivities for chromate $(CrO_4)^{2-}$ and dichromate $(Cr_2O_7)^{2-}$ anionic species. Both weakly basic and strongly basic anion ion exchange resins can be used for selective chromate removal, but the strongly basic resins are prone to fouling by silica and organics. Also, in order to remove the chromates and dichromates from the strongly basic resin, regeneration with a caustic/brine solution is necessary. The weakly basic resins on the other hand are more resistant to fouling and can be regenerated using caustic alone. For these reasons, the recent trend has been to use weakly basic resins. One such resin is Amberlite IRA-94 TM manufactured by Rohm and Haas. After a service run, IRA-94 TM is regenerated with sodium hydroxide to remove and recover the chromium, leaving the resin in its free base form. In order to convert it back to the anionic form, it must be conditioned with a suitable acid.

The overall service and regeneration cycle is summarized as follows:

SERVICE

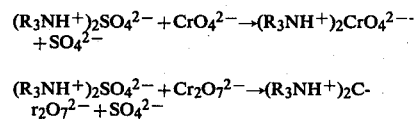

REGENERATION (ELUTION) WITH CAUSTIC SODA

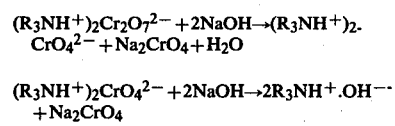

ACID CONDITIONING

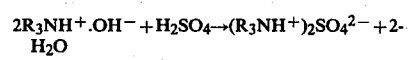

Hydrochloric acid can also be used following a similar service and regeneration cycle.

SERVICE

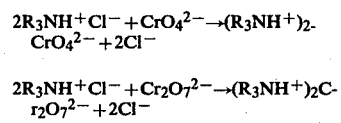

REGENERATION ELUTION WITH CAUSTIC SODA

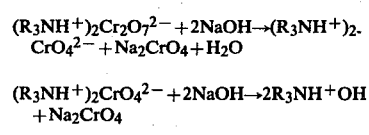

ACID CONDITIONING

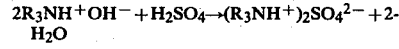

The optimum pH for removal of chromium is a pH between about 4.5 and about 5.0.

The Japanese have made use of the above and developed a system employing the Amberlite IRA-94 TM in one vessel or column for the removal of chromate and a carboxylic acid cationic exchange resin in another vessel or column for the removal of zinc. The system is operated with two columns of Amberlite IRA-94 in series (merry-go-round) in order to minimize leakages from the second column and approach maximum loading of the anion exchange resin. In addition, acid injection is employed to maintain proper pH control. While the Japanese have not specified the type of carboxylic acid cation exchange resin used in the above system, they have the choice of the strongly acidic cation resins or weakly acidic cation resin. Strongly acidic cation resins however, are not preferable since they selectively remove all the cations contained in a typical blowdown. As the zinc is only a small percentage of the total cations present in the effluent the capacities of these resins for zinc are extremely low. Therefore weakly acidic cation resins would be preferable, but to obtain optimum zinc removal, the resins should be operated at a pH greater than about 6.5.

An intermediate acid (also known as a weak acid) cation exchange resin with phosphonic acid functional groups on a cross-linked polystyrene matrix having the repeating structural formula:

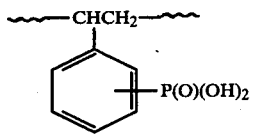

manufactured in accordance with the teachings of U.S. Pat. No. 2,844,546 as Duolite ES-63 TM by Diamond Shamrock Corporation or TSAP-40 TM supplied by Petro-Metals Recovery Systems Limited has been found to be highly useful in the selective removal of zinc by ion exchange. Since the resin is a weakly acidic cation resin, it is best operated at a pH of greater than about 6.5. Indeed, tests conducted by Dale G. Chamberlain of the Diamond Shamrock Chemical Company and illustrated in his paper, entitled "Selective Removal of Zinc from Cooling Tower Blowdown by Ion Exchange" employs a blowdown having a pH in the range of 7.6 to 7.8 fed to the column for the removal of zinc.

It is the ability of the ES-63 and TSAP-40 resin to selectively remove zinc which gave rise to the development of this invention. If a method of combining this resin together with one of the many anion exchange resins selective of Chromium could be effectively provided employing a single vessel, considerable cost, equipment and support equipment, and space, savings could be achieved.

As, or more, important would be the ability to employ greater concentrations of zinc as a corrosion inhibitor with the chromium in the preferred chromate forms. However, the expected optimum pH at which the two resins will operate effectively, and be regenerated effectively, differ considerably. Additionally, the regeneration of these resins in the same vessel to provide satisfactoy recycled resin would be difficult if not impossible to say the least, as it would be expected that a regenerant for each resin would be a contaminant of the other. In this instance, the regeneration process of these resins would be expected to yield forms not satisfactory for this ion exchange process. Consequently, physical separation into different vessels, of the resins prior to regeneration would appear to be necessary.

Two or more resins combined in the same vessel or column may exist in truly mixed or stratified layered forms. Each presents its own inherent problems with ion removal related to the pH of the system and problems of regeneration. Since this specification is not meant to be treatise on the above (ion exchange techniques being well understood by any man skilled in the art), reference may be had to two technical bulletins published by Dewplan (WT) Ltd., 125 London Road, Wycombe, Bucks, Technical Bulletins 6 and 8 entitled "COUNTERFLOW REGENERATION" and "MIXED BEDS" respectively, for refreshment.

Briefly, a column or vessel containing the resins includes distributors internally positioned in the vessel as needed. Depending on their use, the identical structure may be called a sub-surface washer, regenerant collector, or regenerant distributor. In some vessels, some or all of these distributors (or washers or collectors) are omitted entirely. With these distributors, co-current and counter current regeneration may be carried out together.

Exhaustion of a conventional mixed bed requires the backwashing of the resins to separate the two resins prior to regeneration, with the anion resin on top. Regenerant distributors, sub-surface washer and/or collectors are suitably located in, over or under the resin bed for the addition and collection of various aqueous solutions or effluents common to this process. For example, a regenerant distributor may be suitably located at the interface of two resins.

During the regeneration sequence, for example, sodium hydroxide percolates downwardly through the anion resin and is removed via the regenerant distributor. Then acid may for example, be either passed up through the cation resin and removed via the same regenerant distributor, or passed down from the regenerant distributor through the cation resin to another collector.

In this case, if there is too much cation resin in the vessel, the cation resin above the regenerant distributor does not come in contact with the acid regenerant, but does make contact with the caustic, which completely converts the resin into the sodium form. The portion of cation resin above the regenerant distributor is therefore in the sodium form instead of the hydrogen form and this causes high sodium leakages during the subsequent service run.

Similarly, if there is too little cation resin in the vessel, a portion of anion resin will be below the regenerant distributor and this resin will not make contact with the caustic, but be completely converted into the sulphate form during the passage of sulphuric acid. During the subsequent service run, there will be a high sulphate leakage. The regenerants can therefore be, and are "contaminants" if the resin interface is incorrect in relation to the regenerant distributor.

Additionally, during a service run, a portion of the resin's chemical structure is changed into a different ionic form and this conversion will result in a swelling or contraction of the resin. The resulting "resin volume change" will be constant only if the mixed bed is taken to the same exhaustion point on each occasion. If not, after the backwash, the interface will be incorrect in relation to the regenerant distributor and the problems outlined above will occur.

With reference to the distributors, they must be designed with a physical strength sufficient to withstand the various operating conditions exerted upon them and a hydraulic ability to spread the regenerants evenly across the surface area of the bed to provide even cross-sectional flow.

In addition, the distributor construction material has to resist attack by both acid and alkali solutions. Material selection therefore, is important to comply with operating design conditions.

Furthermore, mixed beds are used in many different applications varying widely in operating conditions. The different operation assignments must be carefully examined and taken into account during engineering design of the vessels and their internals. For example, in the application of a mixed bed being used as a condensate polisher (operating on semi-pure water) the chemical kinetics are such that for a given size (as compared to the same size mixed bed operating under more complex water treatment conditions) the service run to regeneration may last for days, or even weeks, whereas, in a different situation, the same mixed bed may only be operational for hours. Factors of principal interest which must be accountable are given as additional examples.

A packed resin bed on downflow mode of operation has a very high internal friction and a buried distributor is more or less locked in the resin mass and movement of the bed will transmit great strain to the distributor. During air mix, especially when the air flow first goes up through the settled bed, there may be a tendency for large bubbles of air to come up one side of the vessel, pushing large masses of agglomerated resin with them and this exerts heavy torsional forces in an upward direction.

Compacting of the bed during service also occurs, which means the distributor has to withstand a distributed load equivalent to the hydraulic pressure exerted by the incoming water. A six foot diameter bed operating with a 10 p.s.i. pressure drop, can subject the distributor to loads in excess of 18 tons.

In addition, actual flow velocities can go as high as 50 g/sq. ft./min. with consequent large pressure losses and any distributor strong enough to withstand the resulting force would cause unacceptable flow disturbance within the bed.

As a result of these experiences, it is now normal practice to move the resins out of the mixed bed for separation and regeneration.

Keeping the above in mind, it is therefore an object of this invention to combine a resin of the structure of ES-63 TM or TSAP-40 TM and one of the many anion exchange resins selective of chromium, in the same vessel for the simultaneous selective removal in the same vessel of zinc and chromium and provide processes for simultaneous selective removal in the same vessel of the zinc and chromium and the regeneration of the resins for reuse.

Further and other objects of the invention will be realized by those skilled in the art from the following summary of the invention and detailed description of the various embodiments illustrated thereafter.

SUMMARY OF THE INVENTION

Unexpectedly, when a resin of the structure as Duolite Es-63 or TSAP-40 resins in their various forms, including their regenerated free base and H+ forms resulting from proper sequential regeneration procedures and an anion exchange resin being selective of chromium, in its ionic form, were combined in a mixed bed or stratified in layers in the same vessel and effluent passed therethrough, removal of zinc in its ionic form, and chromium in its chromate and dichromate ionic forms, from the effluent was highly successful. Equally unexpectedly, acid and caustic used as the regenerants for each of the resins, did not contaminate the other resin.

Because the regenerant used to regenerate one resin in the invention unexpectedly are not contaminants of the other, different techniques for regeneration by ion exchange may also be used, for example:

MIXED BED REGENERATION TECHNIQUE

COUNTER CURRENT REGENERATION TECHNIQUE

CO-CURRENT REGENERATION TECHNIQUE

Therefore, according to one aspect of the invention, a process step in a process for the removal of chromium in its chromate and dichromate ionic forms, and zinc in its ionic form is provided, the process step comprising the passing of effluent through a bed of anion exchange resin and cation exchange resin, in the same ion exchange vessel, the anion exchange resin being selective of the chromium and the cation exchange resin being an intermediate acid cation exchange resin with a phosphonic acid functional group on a cross-linked polystyrene matrix having the repeating structural formula:

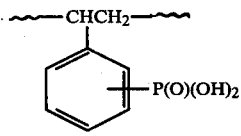

being selective of zinc in its ionic form.

According to another aspect of the invention, a process is provided, including the steps of, combining an intermediate acid, also known as a weak acid, cation exchange resin, with a phosphonic acid functional group on a cross-linked polystyrene matrix, having the repeating structural formula:

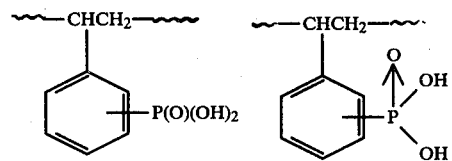

of substantially the same structure as Duolite ES-63 and TSAP-40 selective of zinc in its ionic form with an anion exchange resin selective of, or having an affinity for, chromium in its ionic forms in a single vessel or column, passing effluent containing the chromium and zinc therethrough and regenerating the resins into their useful forms, using acid, and base preferably caustic, by proper sequential regeneration procedures.

According to another aspect of the invention, the pH of the effluent is adjusted to between about 4.5 to 5.0 for optimum chromium removal. Surprisingly, zinc is effectively removed.

According to another aspect of the invention, the resins may form a true mixed bed or be stratified. In relation thereto, it must be appreciated, that chromium leakage from the mixed bed will always be higher than leakage from the stratified beds. This phenomenom may be explained by pH changes. In the mixed bed, the cation resin removes zinc ions from the effluent in exchange for hydrogen ions. The increased [H+] locally depresses the pH resulting in more optimum pH conditions for the removal of chromium, but more competition for the zinc ions by the hydrogen ions for the resin, which resin is also selective for hydrogen, but to a lesser extent. In the stratified bed, on the other hand, the upper anion exchange resin layer does not benefit from the release of hydrogen ions in the lower cation resin layer. The lower concentration of the zinc ions at the stratified bed outlet is explained by the fact that the pH of the effluent increases during the passage through the upper layer of anionic resin. Consequently there is less [H+] in the solution reaching the lower cation exchange resin layer in the stratified bed than reached the cation exchange resin in the mixed bed. With less competition by the [H+] ions for the resin ([H+] affinity for the resin is about 10/37 the $[Zn]^{2+}$ ion affinity for the resin), the concentration of $[Zn]^{2+}$ at the outlet is minimized.

After regeneration with acid and preferably caustic, the cation exchange resin gave best results in its sodium form, while the anion exchange resin gave best results in its chloride form. However, as previously indicated, regenerated forms in their Free Base, (anion resin) and H+ (cation resins) unexpectedly gave satisfactory results so that any combination of the various forms gave satisfactory results.

As previously indicated, the resins may be run in mixed beds or in stratified layers—a mixed bed by backwashing becoming stratified layers—. The service run for zinc can be represented by the equation: (those for chromium have been previously illustrated) R P(O)-$(O^-Na^+)_2$+Zn $Cl_2 \rightarrow$ R $P(O)(O_2Zn)$+2 Na Cl The column or vessel preferably contains regenerant distributors at the top and bottom of the vessels and one centrally located either in the upper anionic ion exchange resin or at the interface between the layers of resin in the vessel, where the resins are stratified, dependent upon the method of regeneration that will be employed.

Three possible methods of regeneration of the resins are illustrated below.

The resins employed for illustration purposes are TSAP-40 and Amberlite IRA-94. With a regenerant distributor at the interface of stratified layers of resin, a mixed bed regeneration, (a combination of counter current co-current co-current regeneration) may be used.

1. Backwash to separate the resins and clean the bed, the TSAP-40 will be the bottom layer and the IRA-94 the top layer. (If the vessel has been operating with the resins in the stratified form, the resins will not require separation).

2. HCl injected at the bottom of the unit, up through the TSAP-40 and out of the unit via the regenerant distributor. The zinc was removed from the TSAP-40 resin which was converted to the hydrogen form.

3. NaOH injected at the top of the unit, down through the IRA-94 and TSAP-40 and out the bottom of the unit. The caustic removed the chromium from the IRA-94 which was left in the "free base" form. The excess caustic converted the TSAP-40 from the hydrogen form to the sodium form;

4. HCl injected at the top of the unit, down through the IRA-94 and out of the unit via the regenerant distributor. This step converted the IRA-94 from the "free base" to the chloride form;

5. Air mix optional.

It is of course, well understood in ion exchange that a water rinse is preferably used between each addition of acid and caustic.

The unit was then ready for service, with the TSAP-40 in the sodium form and the IRA-94 in the chloride form (the preferred forms). Alternatively, by omitting the final HCl injection, the unit could operate with the IRA-94 in the free base form and the TSAP-40 in the sodium form.

This method of regeneration may be chemically described by equation as follows:

Using IRA-94

(1) 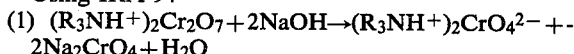

(2) 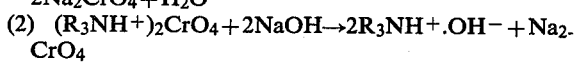

(3) 

Using TSAP-40

(4) 

(5) 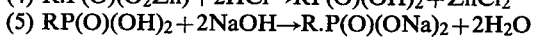

Advantages of mixed bed technique herein compared to the standard mixed bed technique.

1. The regenerant for each resin is not a contaminant for the other;

2. Regenerants are used efficiently. In (3), the caustic is used to regenerate the IRA-94 and condition the TSAP-40;

3. The position of the resin interface relative to the regenerant distributor, after backwash is not critical as the result of having too much TSAP-40 in the unit would be to position TSAP-40 above the regenerant distributor. Therefore the zinc held thereby would be removed by the passage of HCl during stage 4 and would be in the hydrogen form at the end of the regeneration. Too little TSAP-40 would result in a portion of IRA-94 below the regenerant distributor. Therefore, the chromium would be removed by the passage of NaOH during Stage 2 and at the end of the regeneration the rest would be in "free base" form. With a regenerant distributor at the top, bottom and in the upper anion exchange resin stratified layer, a sequence of co-current counter current, or counter current co-current, regeneration could be used employing the regenerant distributor as the introducer for the co-current regeneration step and as the collector for the counter current regeneration step so that the top part of the upper layer of anion exchange resin is always in exhausted form, and NaOH, then HCl, or HCl and the NaOH respectively as the regenerants.

During regeneration, one of the regenerants entered the vessel at the bottom, passed up through the resin bed and left via the top distributor. In order to keep the resin bed compact during this injection, either an air or water block blow was applied to the resin bed. The block flow entered the vessel by the main outlet and left via the top distributor together with the spent regenerant. The portion of resin above the top distributor, was not regenerated.

This method, although employing a counter current injection at one stage, is better described as a split regeneration technique since it is a combination of both co-current and counter current techniques.

The regeneration procedure was as follows:

1. Backwashed to clean and separate the resins (if necessary). The TSAP-40 was the bottom layer and the IRA-94 the top layer.

2. NaOH injected at the top of the unit, down through the IRA-94 and TSAP-40 and out the bottom of the unit. The caustic removed the chromium from the IRA-94 which was converted to the free base form.

3. HCl injected at the bottom of the unit up through the TSAP-40 and IRA-94 and out via the top distributor. The acid removed the zinc from the TSAP-40 which was left in the H+ form. The excess acid converted the IRA-94 from the free base to the chloride form.

4. Air mix optional.

The unit was then ready for service with the TSAP-40 in the hydrogen form and the IRA-94 which is below the top distributor in the chloride form. The portion of IRA-94 was in the free base form and all the TSAP-40 was in the sodium form. There was no change in vessel design, the acid still entered at the bottom and the caustic at the top. In this case, the regeneration procedure was:

1. Backwashed;

2. HCl injected at the bottom of the unit up through the TSAP-40 and IRA-94 and out via the top distributor. The acid removed the zinc from the TSAP-40, converting the resin to the hydrogen form;

3. NaOH injected at the top of the unit, down through the IRA-94 and TSAP-40 and out the bottom of the unit. The caustic removed the chromium from the IRA-94 which converted the resin to the free base form. The excess caustic converted the TSAP-40 from the hydrogen to the sodium form;

4. Air mix optional;

At first it would appear that the same results could be achieved by always injecting the caustic at the bottom of the unit and acid at the top.

This is not the case, as the portion of IRA-94 above the top distributor would never be in contact with the caustic and would never be regenerated. In the above situation where the acid is always injected at the bottom of the unit, the portion of IRA-94 above the top distributor is always in the free base form at the end of the regeneration, regardless of whether the acid or caustic is injected first.

This method of regeneration may be chemically described by the following equations:

Using IRA-94

(1) $(R_3NH^+)_2Cr_2O_7{}^{2-}+2NaOh \rightarrow (R_3NH^+)_2CrO_4{}^{2-}+2Na_2CrO_4+H_2O$ (2) To Yield Free Base $(R_3NH^+)_2CrO_4{}^{2-}+2NaOH \rightarrow 2R_3NH^+.OH^-+Na_2CrO_4$ (3) To Yield Chloride Form $R_3NH^+OH^-+HCl \rightarrow R_3NH^+Cl^-+H_2O$ for that anion resin below regenerant distributor Using TSAP-40

(4) $R.P(O)(O_2Zn)+2HCl \rightarrow RP(O)(OH)_2+ZnCl_2$ when HCl added, then NaOH Using TSAP-40

$R.P(O)(O_2Zn)+2HCl \rightarrow RP(O)(OH)_2+ZnCl_2$
$RP(O)(OH)_2+2NaOH \rightarrow R.P(O)(ONa)_2+2H_2O$ Using IRA-94

(1) $(R_3NH^+)_2Cr_2O_7+2NaOH \rightarrow (R_3NH^+)_2CrO_4+2Na_2CrO_4+H_2O$ (2) $(R_3NH^+)_2CrO_4+2NaOH \rightarrow 2R_3NH^+.OH^-+Na_2CrO_4$ With respect to co-current regeneration techniques, this is the simplest form of the regeneration techniques, with all the regenerant entering the unit above the resin bed and passing downflow through the resin bed.

3. with regenerant distributors at the top and bottom (as the collector), the co-current introduction of NaOH followed by HCl or HCl followed by NaOH.

This method of regeneration may be chemically described by the following equations:

(a) Using once again, IRA-94 and TSAP-40: NaOH then HCl addition.

(1) $(R_3NH^+)_2Cr_2O_7+2NaOH \rightarrow (R_3NH^+)_2CrO_4{}^{2-}+2Na_2CrO_4+H_2O$ (2) $(R_3NH^+)_2CrO_4{}^{2-}+2NaOH \rightarrow 2R_3NH^+.OH^-+Na_2CrO_4$ (3) $R_3NH^+OH^-+HCl \rightarrow R_3NH^+Cl^-+H_2O$ (4) $(R.POO^-)_2Zn^{++}+2HCl \rightarrow 2R.POO^-.H^++ZnCl_2$ (b) reversing the addition,—HCl and then NaOH (1) $RP(O)(O_2Zn)+2HCl \rightarrow RP(O)(OH)_2+ZnCl_2$ (2) $RP(O)(OH)_2+2NaOH \rightarrow R.P(O)(ONa)_2+2H_2O$ (3) $(R_3NH^+)_2Cr_2O_7+2NaOH \rightarrow (R_3NH^+)_2CrO_4{}^{2-}=+2Na_2CrO_4+H_2O$ (4) $(R_3NH^+)_2CrO_4{}^{2-}+2NaOH \rightarrow 2R_3NH^+.OH^-+Na_2CrO_4$ Since the regenerants for each of the resins is unexpectedly not a contaminant of the other resin, and since the H+ and free base forms of the resins are unexpectedly also useful in removel of zinc and chromium respectively from the effluent, a simple yet effective method has been unexpectedly provided for the removal of zinc and Chromium.

Additionally, this invention provides a unique combination of an intermediate acid cation exchange resin with phosphoric acid functional groups on a cross-linked polystyrene matrix of the formula:

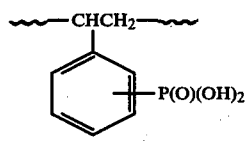

and anion ion exchange resin selective of, or having an affinity for, chromium in the same vessel for the selective removal of zinc and chromium.

The invention will now be illustrated have reference to the following schematics, drawings, and graphic illustrations, illustrating various embodiments incorporating the invention.

BRIEF DESCRIPTION OF THE DRAWINGS

FIGS. 2, 3, and 4, are close-up views of some of the equipment of the recovery system of FIG. 1, schematically illustrating the use of such equipment in the sequential regeneration of the resins, according to various embodiments of the invention.

FIGS. 5 and 6 are close-up views of some of the equipment of the recovery system of FIG. 1A without the sub-surface washer illustrating schematically the use of such equipment in the sequential regeneration of the resins according to various embodiments of the invention.

FIGS. 7 to 18 illustrate graphically results of chromium and zinc removal according to preferred embodiments of the invention.

DETAILED DESCRIPTION OF THE VARIOUS EMBODIMENTS INCORPORATING ASPECTS OF THE INVENTION

Figure 1:
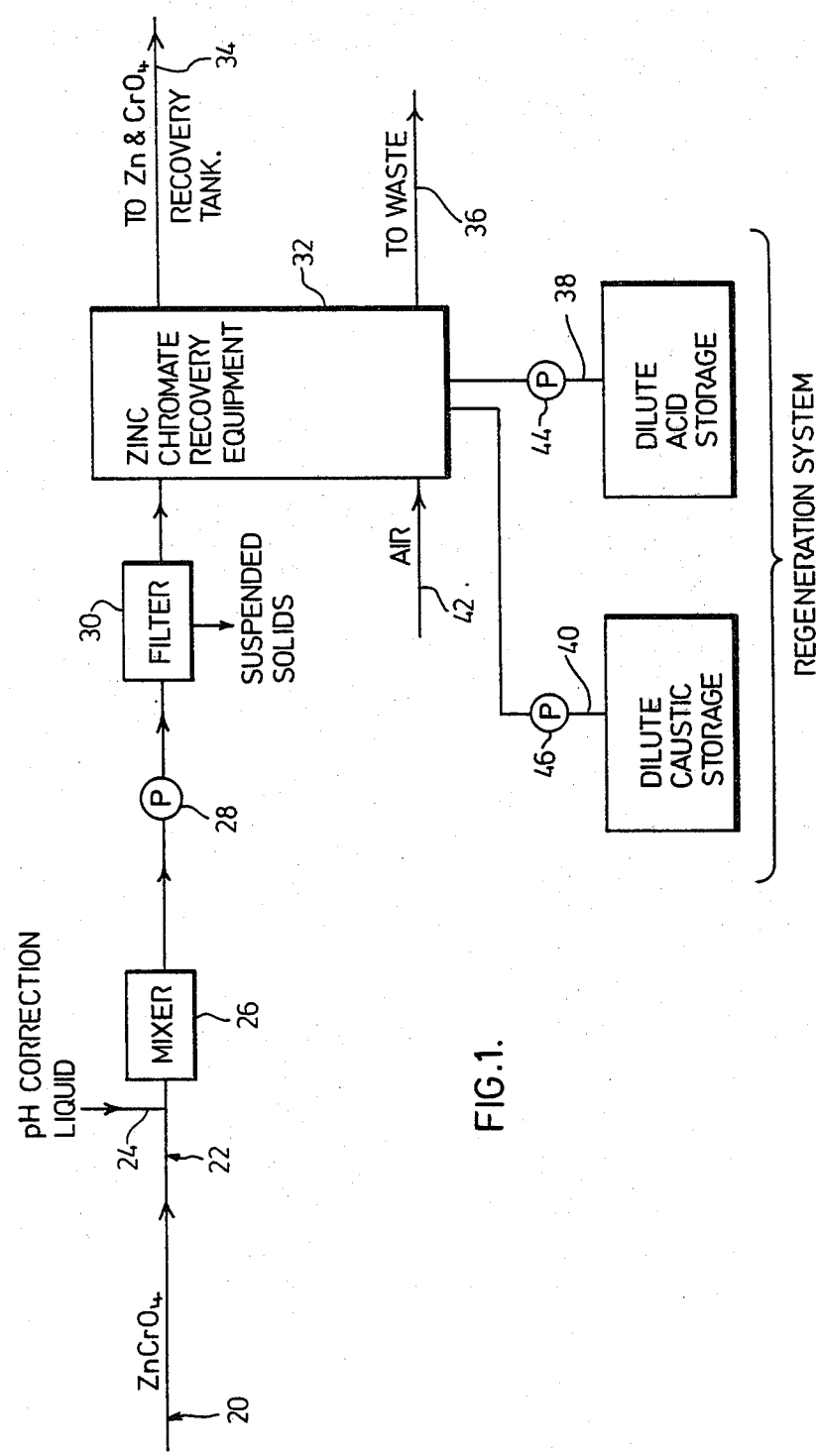
FIG. 1 is a schematic of a recovery system for the recovery of zinc and chromium according to an embodiment incorporating one aspect of the invention.

With reference to FIG. 1, effluent (containing zinc and chromium in its chromate and dichromate forms, the corrosion inhibitors) is introduced to the zinc-chromium recovery system 20 via feed line 22 and appropriately conditioned to adjust its pH by the introduction of pH correction fluid along line 24. The effluent and pH correction fluid are mixed in mixer 26 and fed by pump 28 through filter 30 for the removal of particulate and suspended material to zinc chromate recovery equipment 32 shown in detail in FIG. 1A. $[Zn]^{+2}$ and $[CrO_4]^{-2}$ and $[Cr_2O_7]^{-2}$ are recovered via line 34 with waste material removed via drain 36.

Figure 1A:
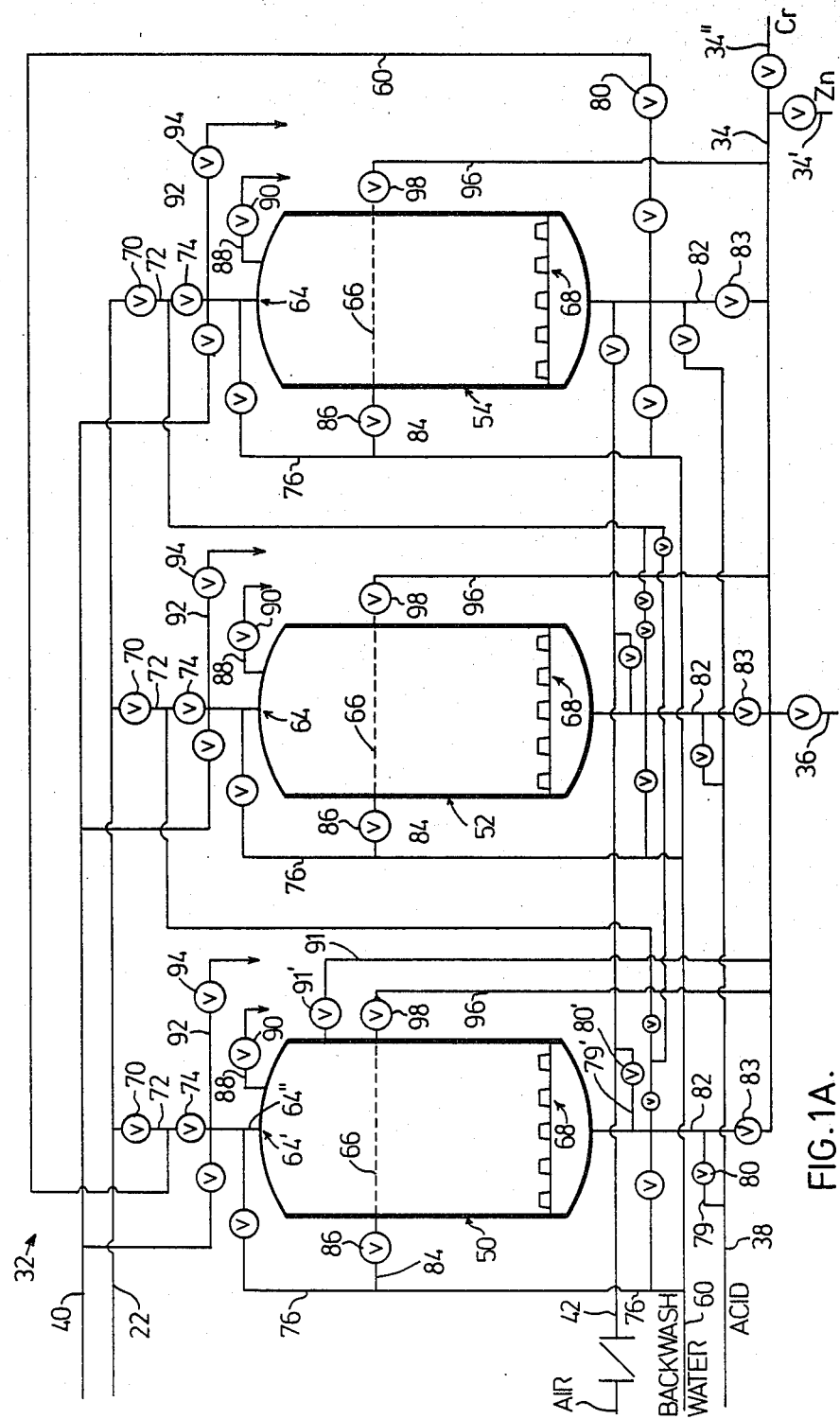
FIG. 1A is a schematic illustrating the part of the recovery system of FIG. 1, shown as the zinc chromate recovery equipment.
Figure 8:
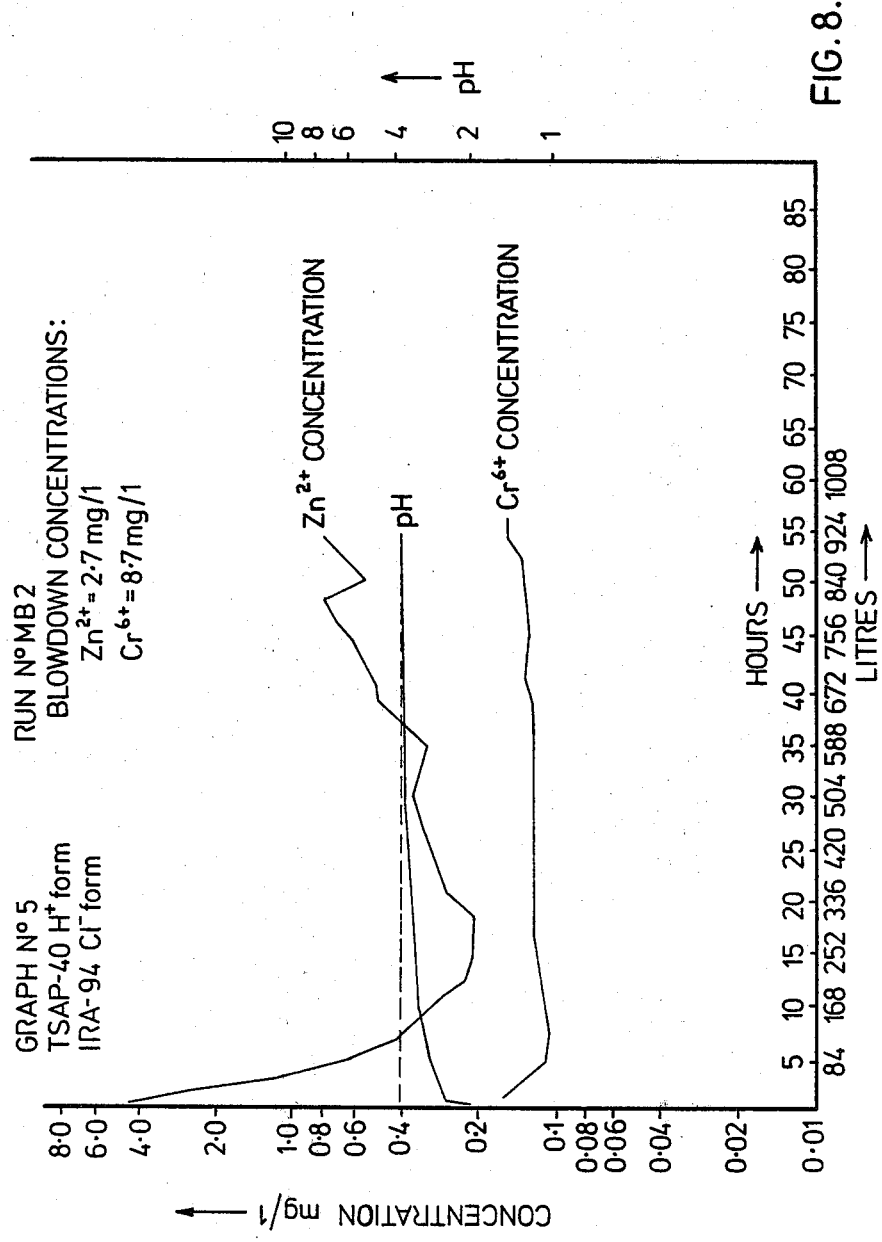
Figure 9:
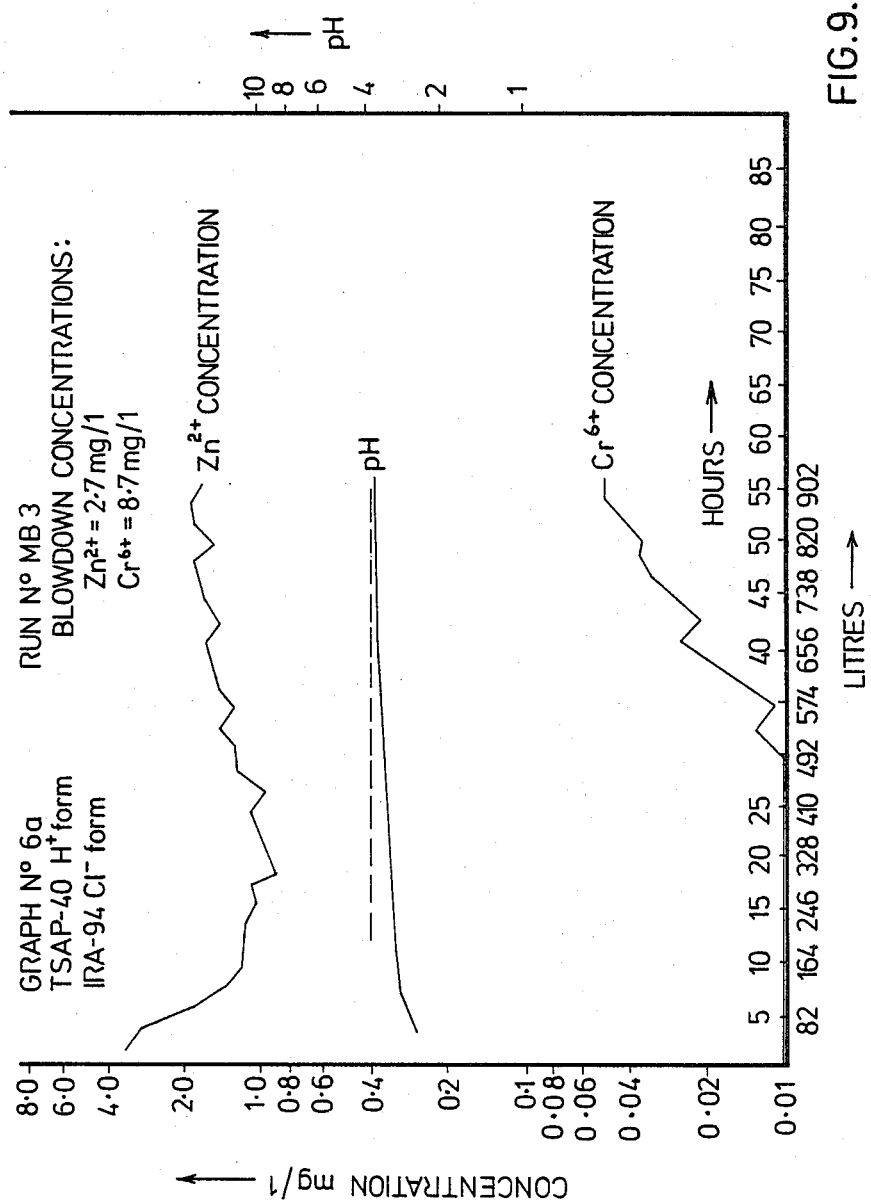
Figure 10:
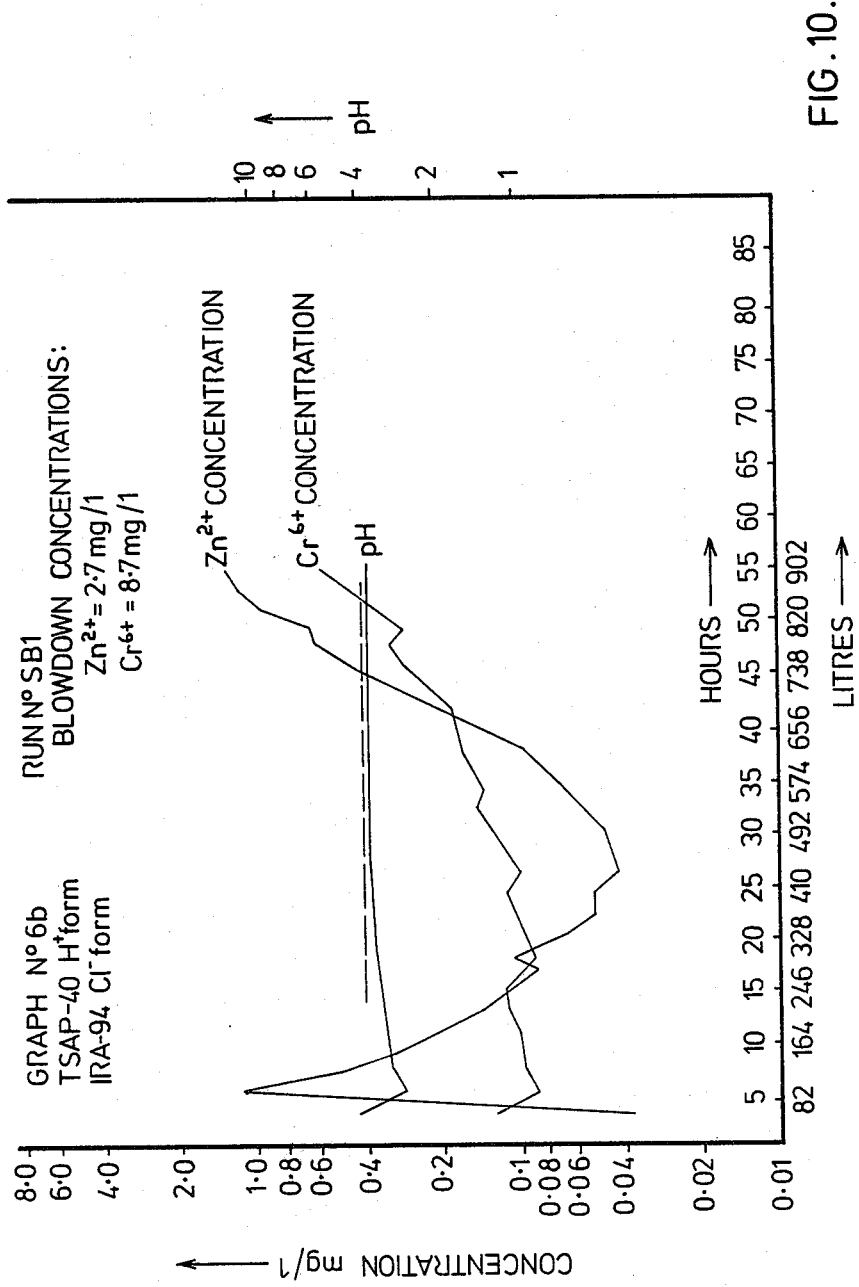
Figure 11:
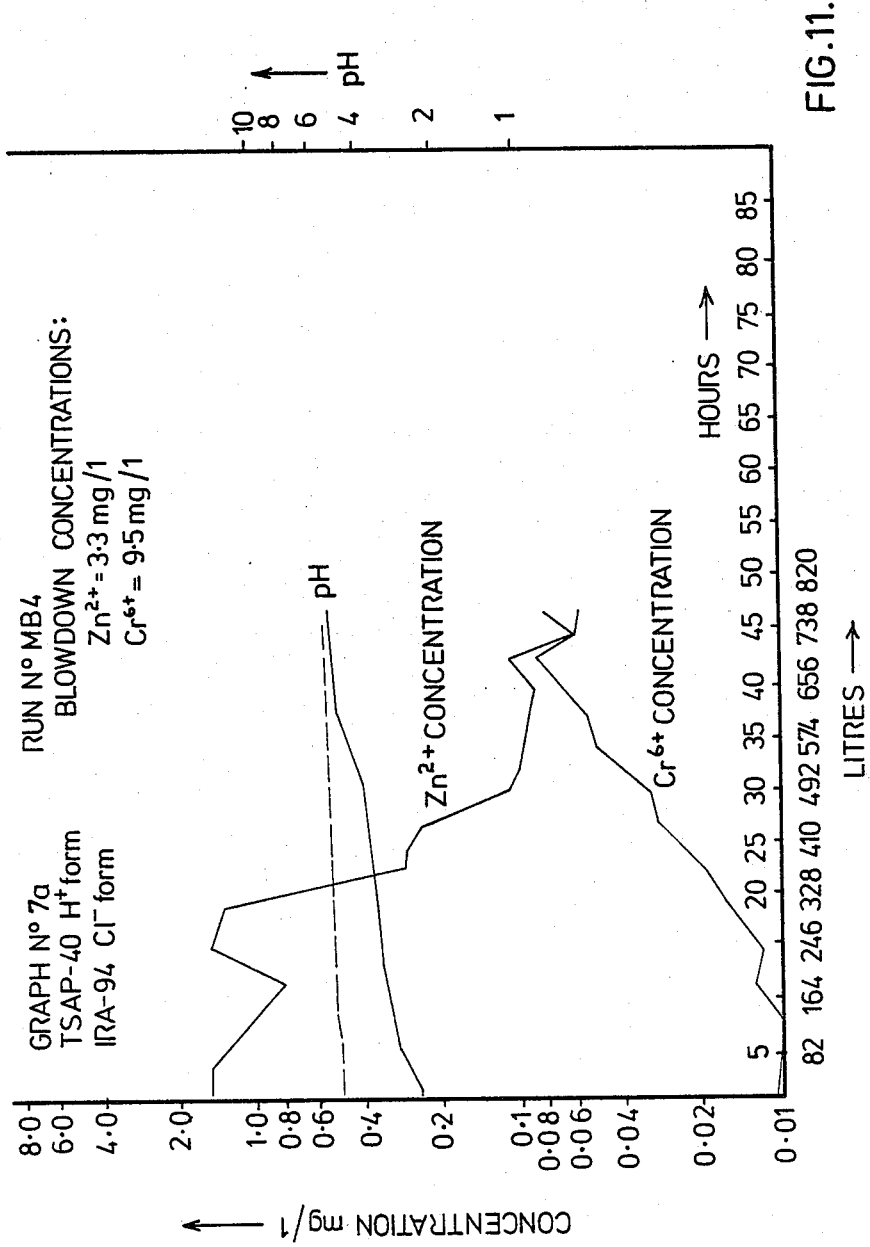
Figure 12:
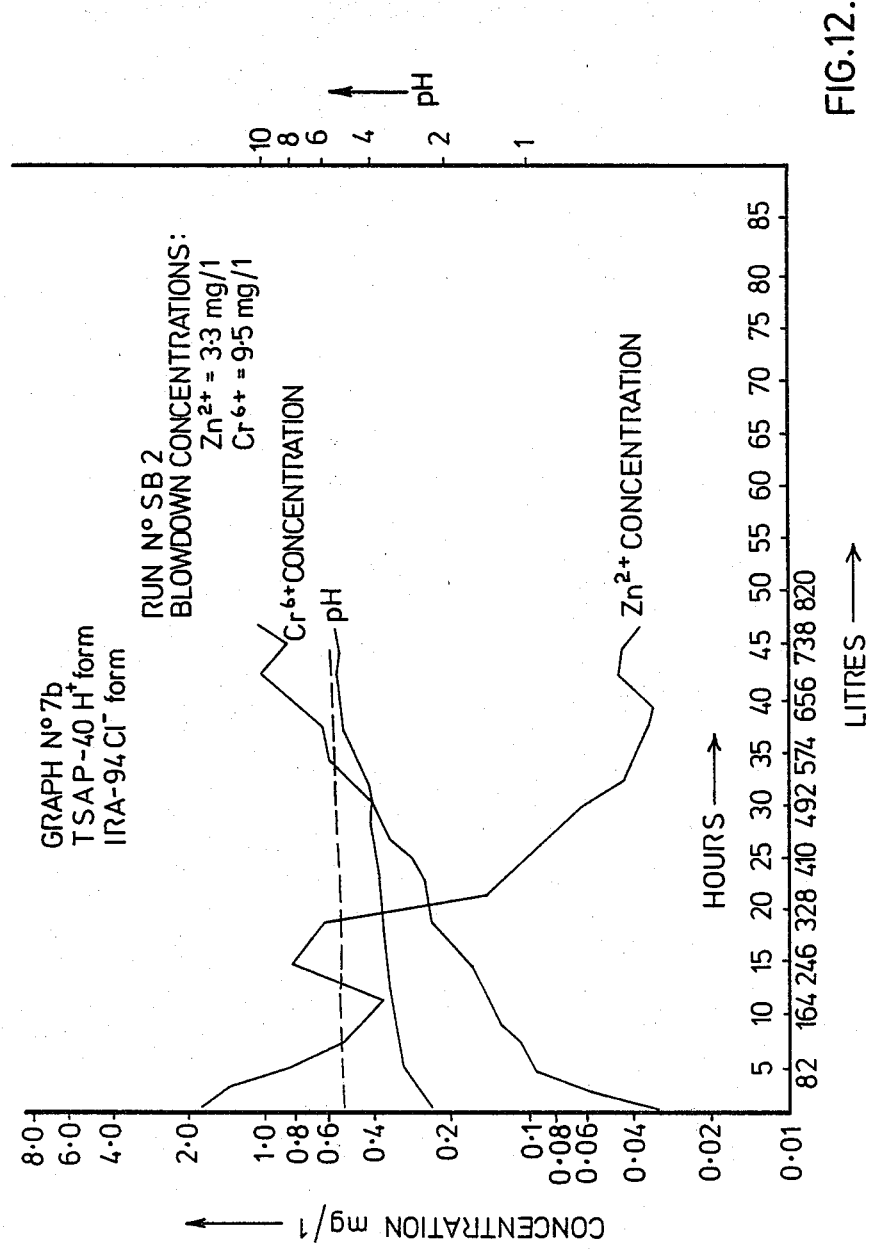
Figure 13:
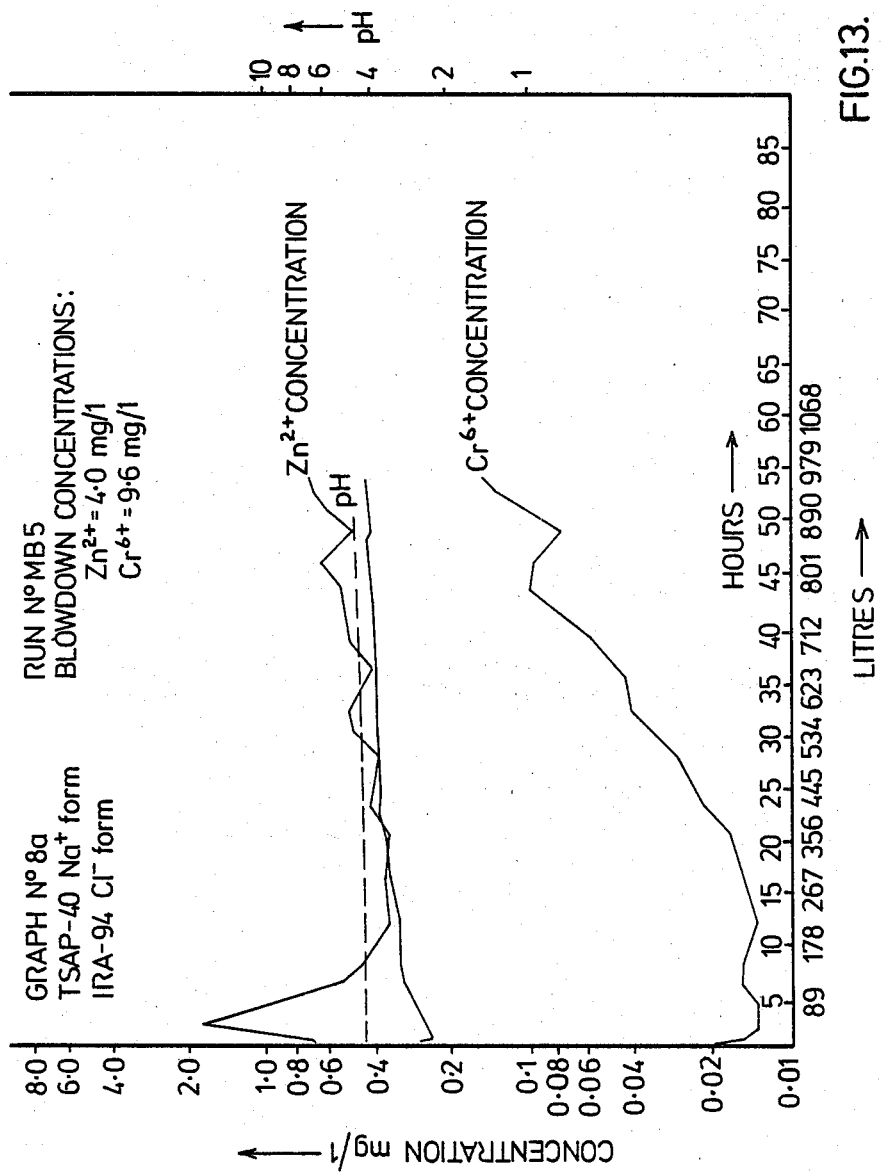
Figure 14:
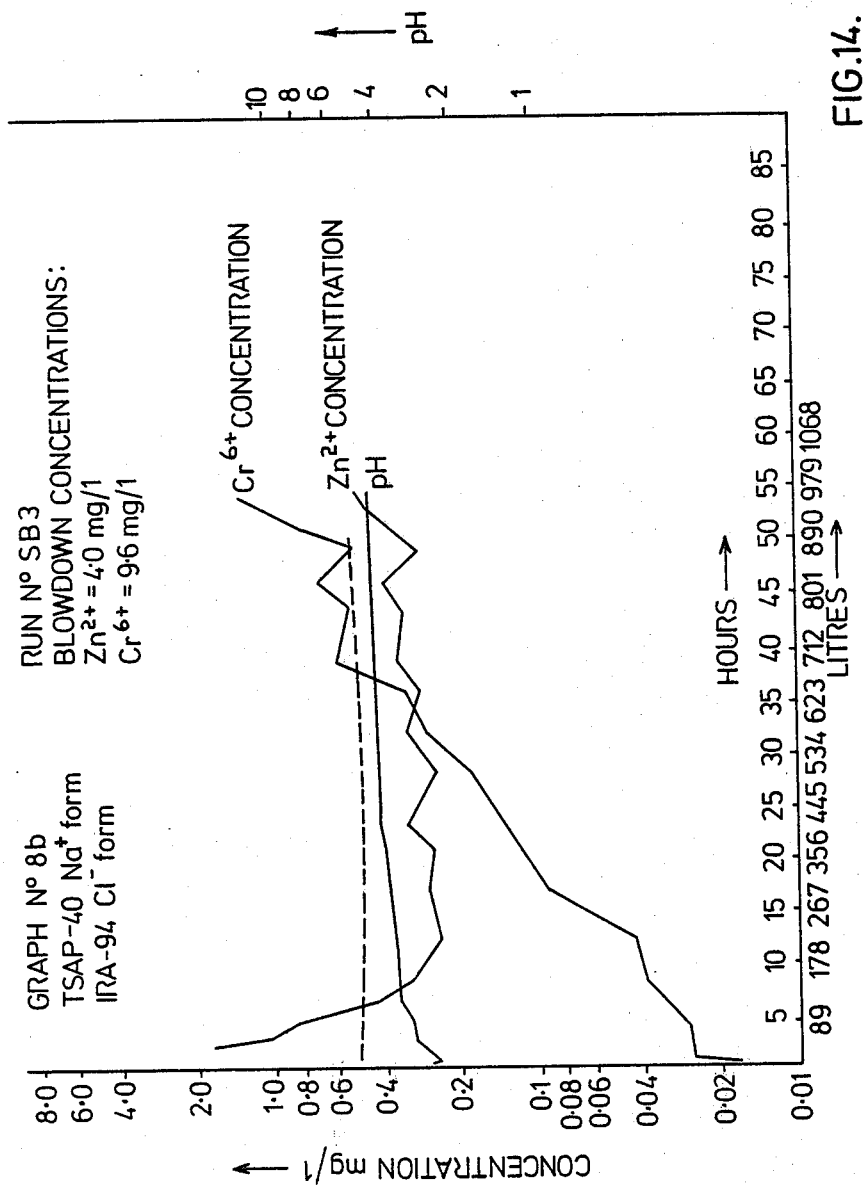
Figure 15:
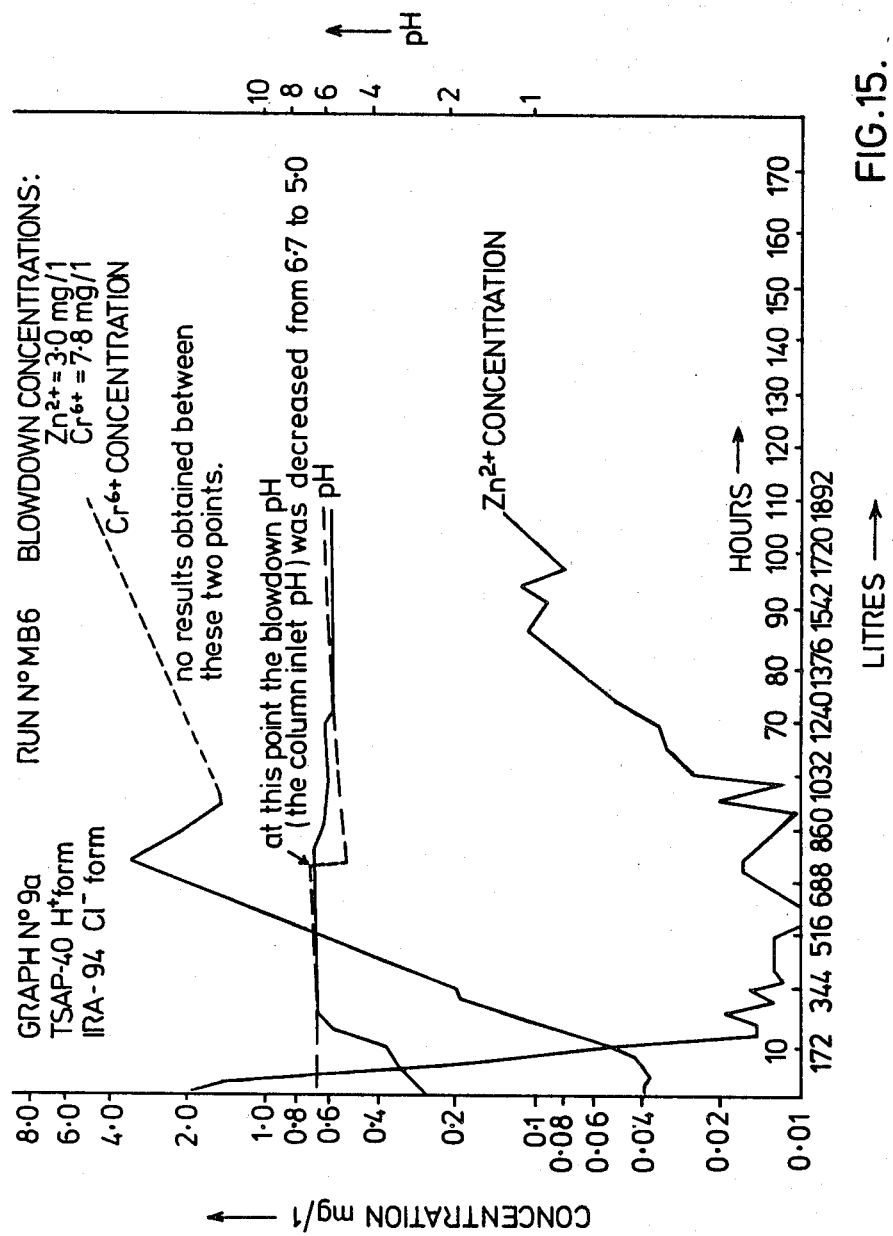
Figure 16:
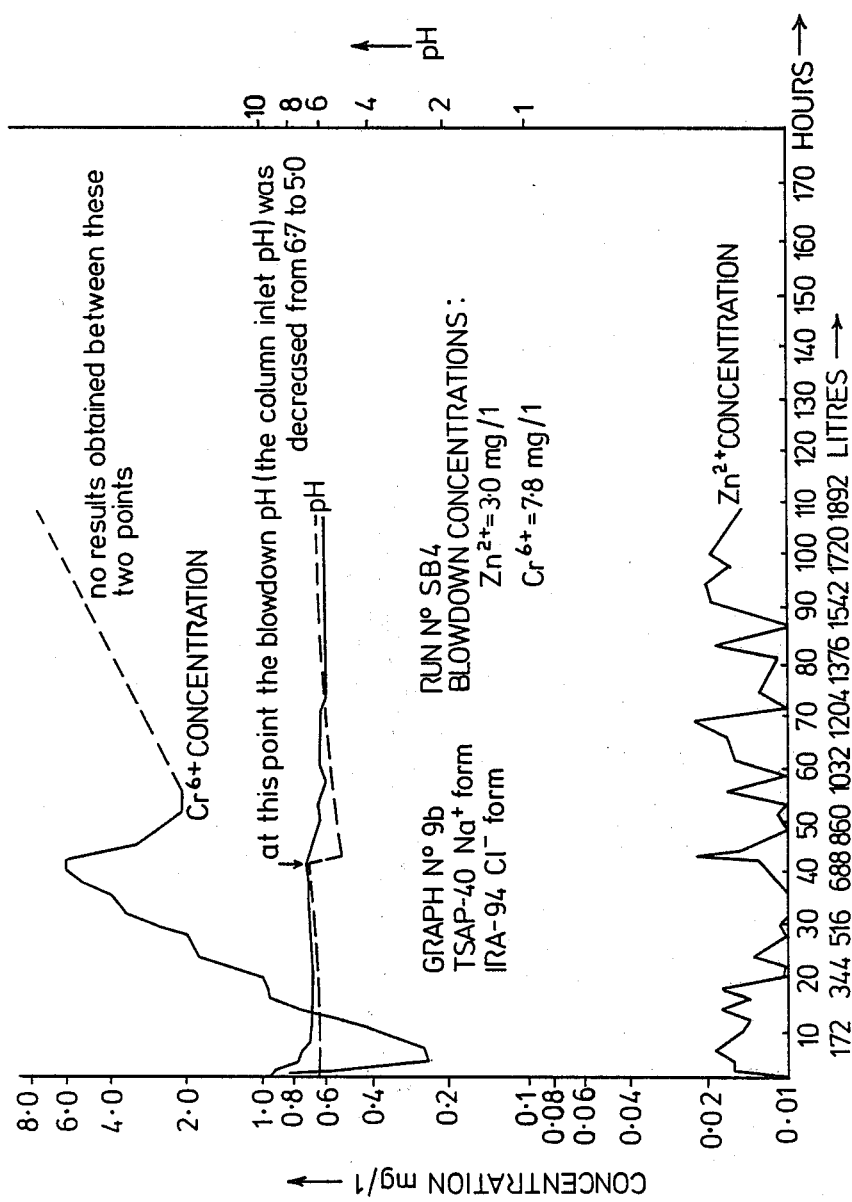
Figure 17:
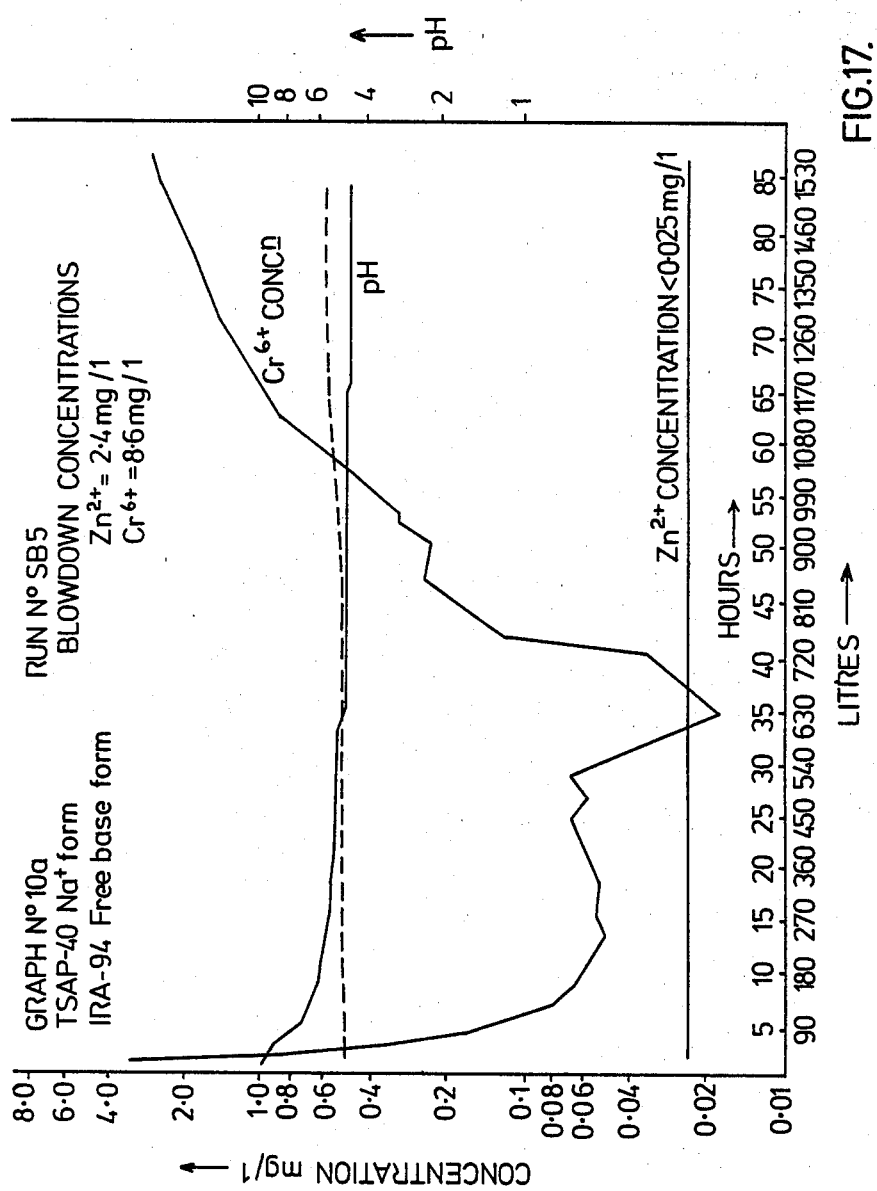
Figure 18:
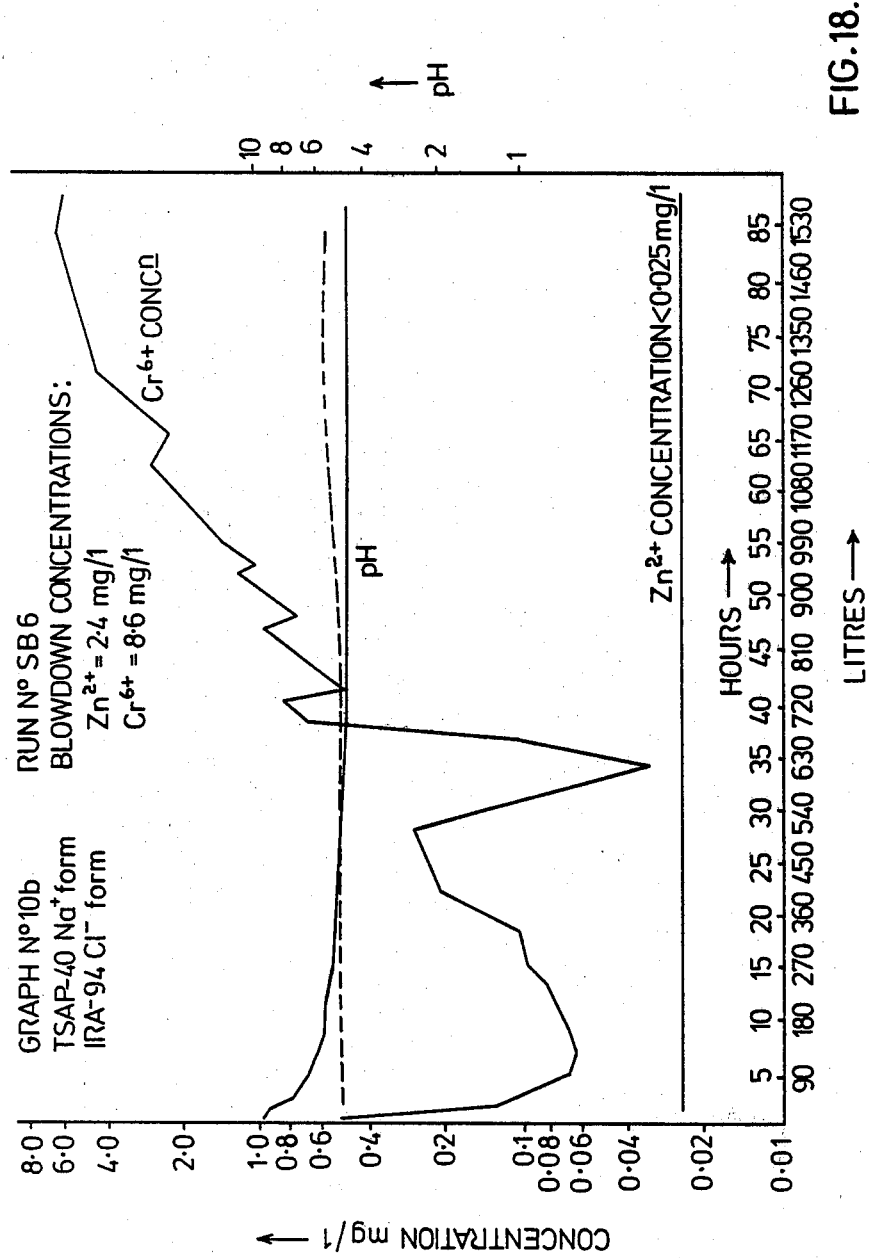

Acid, caustic and air are introduced from storage to the equipment 32 via lines 38, 40, and 42 with the aid of pumps 44 and 46 as shown. As indicated the zinc chromate recovery equipment 32 is shown in FIG. 1A. Essentially, the equipment and set up shown therein is well known to any man skilled in the art, and is presented in diagrammatic form herein, as representative of equipment useful in carrying out the processes according to various embodiments of the invention herein and will be referred to only briefly. Essentially, roughing 50, polishing 52, and standby 54, ion exchange vessels are each provided with effluent feed line 22, caustic feed line 40, acid feed line 38, backwash feed line 60, air line 42, distributors 64, (See FIG. 2), comprising regenerant distributors 64 and inlet distributor $64^{II}$ (See FIG. 2) subsurface washers 66, collectors 68 and associated valving, branch feed lines, and bypass lines, and drain and zinc and chromium recovery lines 36 and 34 respectively, line 34 branching into lines $34^1$ and $34^{11}$ for separate removal of zinc and chromium respectively. Since like feed and withdrawal lines are connected to each of the vessels, as is evident from the drawings reference in this description will be had only to vessel 50. However, like numerals used with reference to components associated with vessels 52 and 54, refer to like components described by those numerals used in relation to vessel 50.

Main line 22 carrying effluent containing corrosion inhibitors consisting of zinc in its ionic form and chromium in its chromate and dichromate ionic forms is connected through isolation valve 70, to line 72 feeding distributor 64 comprising regenerant distributor $64^1$ (seen best in FIGS. 2 to 6 inclusive) through inlet valve 74. Diversion line 76 is connected to line 72 and is connected to backwash line 60 through isolation valve 80. Thus both caustic feed 40 and backwash lines 60 are connected through line 72 to inlet distributor $64^{11}$ and regenerant distributor $64^1$ by suitable feed lines appropriately valved as shown. Acid feed line 38 and air line 42 are connected by lines 79 and $79^1$ respectively, valved at 80 and $80^1$ to collection or drain line 82 connected to collector 68 at one end and appropriately valved at 83 to recovery line 34 and drain 36 at the other. Backwash feedd line 76 is also connected to sub-surface washer 66 via line 84 through valve 86. Outflow or outlet line 88 for the exhaustion of air suitably valved at 90, drain line 91 suitably valved at $91^1$, backwash outlet 92 suitably valved at 94, sub-surface washer outlet 96 suitably valved at 98, are all provided for removal of fluid and materials from vessels 50. Drain line 82 is appropriately valved at 83 for control of recovery.

In use, effluent containing chromium and zinc corrosion inhibitors is passed through main feed line 22 down line 72 through outlet distributor $64^{11}$, through resin bed (not shown) in roughing vessel 50 collected by collector 68 through outlet 82 and down drain 36 or passed into polishing vessel via line 52 for further processing. Regeneration of the resin is then carried out employing the combination of inlets and outlets so provided and discussed above necessary to perform that method of regeneration chosen by the man skilled in the art.

With reference to FIGS. 2 to 6, vessel 50 is shown in close-up, employed in various regeneration techniques, the inlets and outlets to vessel 50 being numbered as shown to correspond with the numerals in FIG. 1A. It must be appreciated that subsurface washer 66, shown in FIG. 1A is disposed in the anion resin in FIGS. 3 and 4, at the interface of the resin in FIG. 2 and, omitted entirely in FIGS. 5 and 6.

With reference to FIG. 2, vessel 50 is used to illustrated the most preferred method of regeneration,—the mixed bed technique. As this method (and the others) were previously discussed, the following should be read in light of the previous discussion.

After the resins are backwashed for separation, so that the sub-surface washer 66 (regenerant distributor) was at the interface of the resins, HCl was pumped upwards from collector 68 through the cation resin and collected by the sub-surface washer (regenerant distributor) 66 at the interface of the resins (See FIG. 2a) the NaOH introduced via regenerant distributor $64^1$ for passage through the resins for removal by the collector 68 along line 82 (FIG. 2b) lines 34 and $34^1$ for removal of chromium, then HCl fed downwards through the anion resin and through regenerant distributor 66 at the interface along line 34 (FIG. 2c). In this way, after regeneration, the anion resin was in its most effective $(Cl^-)$ form, and the cation resin was in its most effective $(Na^+)$ form.

With reference to FIG. 3, sub-surface washer 66 (or as it is also called, regenerant distributor) was buried just under the surface of the anion resin, with distributors $64^1$ and $64^{11}$ both above, and collector 68 below, the resin bed (as in FIG. 2).

Regeneration was accomplished by feeding NaOH through the bed from distributor $64^1$ to collector 68, for removal via line $34^{11}$ (FIG. 3a), followed by HCl introduced from the bottom collector 68 and taken out through the sub-surface wash distributor 66 shown in FIG. 3b, and removed via lines 96, 82, 34 and $34^1$ leaving the anion resin in its $(Cl^-)$ and Free Base (F.B.) form and the cation resin in its $(H^+)$ form. The addition of the NaOH and HCl may be reversed (shown in FIGS. 4a and 4b) leaving the anion resin in its free base form and cation resin in its $(Na^+)$ form. The form of regeneration illustrated in FIG. 3 is co-current counter current regeneration and that in FIG. 4 is counter current co-current regeneration.

The use of central sub-surface washer (regenerant distributor) 66 in the resin may be omitted in which event, regeneration may be entirely co-current, as illustrated schematically in FIGS. 5 and 6 with each of NaOH and HCl added successively as shown in FIGS. 5a and 5b, above the resin by regenerant distributor $64^1$ for percolation therethrough for collection at collector 68, and removal along lines $34^{11}$ and $34^1$ respectively, or in reverse shown in FIGS. 6a and 6b. By regeneration as shown in FIG. 5 the anion resin is in its Cl⁻ form while the cation resin is in its H⁺ form. Regeneration in the reverse order shown in FIG. 6 yields the anion resin in its free base (F.B.) form and cation resin in its Na⁺ form.

For a better understanding of the invention, reference will be had to results of a test operation.

A synthetic cooling tower blowdown was prepared in a 3,000 liter (793 US gal) capacity fibreglass tank and pumped to a constant head tank, the overflow being returned to the tank. The ion exchange columns were gravity fed from the constant head tank and the flows through the columns were maintained by adjusting the outlet valves.

Five blowdown tanks numbered 3 to 7 inclusive were utilized. The synthetic blowdown was prepared by adding suitable chemicals to Calgary tap water, shown in Table No. 1.

TABLE NO. 1

BLOWDOWN COMPOSITIONS

| | Blowdown Tank No. | | | | |
|---|---|---|---|---|---|
| | 3 | 4 | 5 | 6 | 7 |
| pH | 4.0 | 5.0 to 5.8 | 4.5 to 5.0 | 6.2 to 6.7 | 4.5 to 5.8 |
| Alkalinity T as CaCO₃ | 8.2 | 23 | 3.0 | 121 | 7 |
| Conductivity umhos | 2050 | 2320 | 2140 | 2300 | 2130 |
| Total Dissolved Solids | | 2141 | 2010 | 2024 | 1942 |
| Sulphate SO₄ | 1150 | 1238 | 1288 | 1212 | 1175 |
| Chloride Cl | 91 | 179 | 116 | 133 | 91 |
| Calcium Ca | 141 | 139 | 125 | 123 | 116 |
| Magnesium Mg. | 95 | 108 | 100 | 93 | 92 |
| Sodium Na | 247 | 328 | 288 | 1680 | |
| Total Hardness as CaCO₃ | 746 | 791 | 726 | 692 | 667 |
| Total Chromium Cr | | 9.7 | 10.0 | | |
| Hexavalent Chromium Cr⁶⁺ | 8.7 | 9.5 | 9.6 | 7.8 | 8.6 |
| Zinc Zn²⁺ | 2.7 | 3.3 | 4.0 | 3.0 | 2.4 |

The columns used were clear Perspex TM, having an internal diameter of 2.75". During the runs for the mixed and stratified bed runs, 0.5 liters (0.13 US gals) of both TSAP-40 and IRA-94 were placed in each column to produce a bed depth of approximately twelve inches. Resin capacities are often expressed in the number of gallons between regenerations or the number of bed volumes treated, a bed volume being the actual volume of the resin bed. As the columns contained only 0.5 liters (0.13 US gals) of each resin, when the volume of blowdown treated is recorded as say 1,000 liters (264 US gals) this means that the capacity of each resin during the run was in fact 2,000 bed volumes.

Flowrates were checked frequently, and during the runs were in the range of 265 to 300 mls/min (0.070 to 0.079 US gpm) which gave (1.7 to 1.9 US gpm/Ft² of resin). The total bed depth was 1 ft. which meant the flows per cubic foot were also 1.7 to 1.9 US gpm, but the flows per cubic foot of both the TSAP-40 and IRA-94 were double these figures and ranged from 3.4 to 3.8 US gpm/ft³. The manufacturers recommended service flowrates are 0.1 to 3 gpm/ft³ of resin for TSAP-40 and 3 gpm/ft³ of resin for IRA-94.

The column outlets were sampled regularly and analyzed for Cr⁶⁺, Zn²⁺ and pH.

The results are presented in graphical form and the twelve graphs are shown in FIGS. 7 to 18 inclusive. In order to show the wide range of concentrations which occured, the plots are semilogarithmic with the volume and corresponding time being linear and the concentrations and pH being log. The pH scale is logarithmic and was plotted in this manner. The concentration and pH scale is the same on each graph, but the volume scale varies. The pH, hexavalent chromium concentration and zinc concentration at the column outlet, together with the blowdown pH, which is represented by a dotted line, are shown in each graph. Also shown is the ionic form of each resin at the start of the service run and the concentrations of Cr⁶⁺ and Zn²⁺ in the blowdown, which are the concentrations at the column inlets.

The graphs having the same number but designated 'a' and 'b' indicate that two columns, usually one in the mixed form and the other stratified were operated simultaneously on the same blowdown.

A total of six mixed bed runs were made, four of which were run simultaneously with a stratified bed and finally, two stratified beds were run together.

The following table relates the graph numbers to the run numbers and the blowdown tank used during the run. Also shown is the ionic form of each resin at the start of the service run. Mixed bed operation is designated M.B. and stratified bed operation S.B.

| GRAPH No. | RUN NO. | ISAP-40 IONIC FORM | IRA-94 IONIC FORM | BLOW-DOWN TANK NO. |
|---|---|---|---|---|
| 4 | MB1 | H⁺ | Cl⁻ | 3 |
| 5 | MB2 | H⁺ | Cl⁻ | 3 |
| 6a | MB3 | H⁺ | Cl⁻ | 3 |
| 6b | SB1 | H⁺ | Cl⁻ | 3 |
| 7a | MB4 | H⁺ | Cl⁻ | 4 |
| 7b | SB2 | H⁺ | Cl⁻ | 4 |
| 8a | MB5 | Na⁺ | Cl⁻ | 5 |
| 8b | SB3 | Na⁺ | Cl⁻ | 5 |
| 9a | MB6 | H⁺ | Cl⁻ | 6 |
| 9b | SB4 | Na⁺ | Cl⁻ | 6 |
| 10a | SB5 | Na⁺ | Free base | 7 |
| 10b | SB6 | Na⁺ | Cl⁻ | 7 |

The following points should be noted while examining the results.

When the TSAP-40 was operating in the hydrogen form, the column outlet pH always started low, with a corresponding high zinc concentration, which on occasion, was higher than that contained in the blowdown. During service, hydrogen ions were released from the resin in exchange for cations and this led to the formation of mineral acids. When the outlet zinc concentrations were higher than the inlet, the acid stripped the zinc, which remained in the resin after incomplete prior regeneration.

Graphs 9b, 10a, and 10b, indicate how zinc leakage of less than 0.025 mg/l can be obtained when the TSAP-40 operates in the sodium form.

Comparison of mixed and stratified bed runs with the TSAP-40 in the hydrogen form and the IRA-94 in the chloride form show that chromium leakage from the mixed bed was always lower than from the stratified bed, whereas, the zinc leakage from the mixed bed was always higher than from the stratified bed. The effect is clearly shown on graphs 6a, 6b, 7a, 7b and is explained by pH changes. As previously stated, it is thought the mixed bed, the TSAP-40 removes zinc from the blowdown in exchange for hydrogen ions. This "local pH depression" resulted in an improved chromium removal by the IRA-94. In the stratified bed, the IRA-94, being the top layer, did not benefit from the release of hydrogen ions in the lower TSAP-40 layer. The low concentration of zinc at the stratified bed outlet is explained by the fact that the pH of the blowdown increased during passage through a layer of IRA-94 (see earlier report) and consequently, there were less hydrogen ions in the solution which reached the layer of TSAP-40 in the stratified bed than reached the TSAP-40 in the mixed bed. It should be noted that TSAP-40 is selective to hydrogen ions as well as zinc ions and if there are less hydrogen ions in solution, the zinc ions have less competition for sites on the resin.

As will be noted, the effect of pH on the chromium leakage was clearly apparent. A low pH produced a low chromium leakage and this is clearly illustrated on graphs 9a and 9b. During this run, the blowdown pH was lowered from 6.7 to 5.0 by the addition of acid and immediately the $Cr^{6+}$ concentrations at both the mixed and stratified bed outlets dropped. The zinc leakages were unaffected.

The only run illustrated herein with the IRA-94 in the free base form is SB5, shown on graph 10a, wherein, $Cr^{6+}$ can be removed when the resin was operating in this form and for 1,000 liters (2000 bed volumes) the $Cr^{6+}$ leakage was ten times lower than the influent concentration, and for the majority of the run, the concentration was less than 0.5 mg/l.

REGENERATIONS

All the regenerations of the resins herein were carried out in a co-current manner (as shown in FIGS. 5 and 6) will all regenerants entering the top of the column, passing through the resin and leaving the column at the bottom.

The regenerations were numbered in the same manner as the runs, regeneration No. MB1 being the regeneration carried out after run No. MB1. Regeneration Nos. MB1, MB2, MB3 and MB4 were all carried out with the resins in the mixed form. Regenerations MB5, MB6 and all the stratified bed regenerations were carried out with the resins in the stratified form.

Runs were carried out with the resins in various ionic forms and in order to achieve these forms, the sequence of adding the regenerants as previously disclosed was employed. The IRA-94 was regenerated with four liters of 4% NaOH on every occasion, this being equivalent to a regenerant dose of 17.7 lb. of NaOH per ft³ of resin. Rohm and Haas suggest 3 to 5 bed volumes, which for 0.02 ft³ of resin Amberlite IRA-94 would be 6.6 to 11 lb. of NaOH per ft³ of resin. The high regenerant level was chosen deliberately so that sufficient excess caustic was available when needed to convert the TSAP-40 from the hydrogen to the sodium form.

The regenerant dose for the TSAP-40 varied from 6.6 to 16.5 lb. of hydrochloric acid per ft³ of resin, this being equivalent to 1 to 2½ liters (2 to 5 bed volumes) of 6% HCl. The manufacturers suggest a regenerant level of up to 10 lb. of acid per ft³ of resin. The excess acid was used to acid condition the IRA-94.

The regenerants, together with the injection sequence used for each regeneration are shown below and in all cases the hydrochloric acid was 6% and the sodium hydroxide 4%.

| REGEN-ERATION NO. | REGENERANT | | |
|---|---|---|---|
| MB1* | 4 liters NaOH | 2 liters HCl | |
| MB2* | 4 liters NaOH | 2 liters HCl | |
| MB3* and SB1 | 4 liters NaOH | 2 liters HCl | |
| MB4* and SB2 | 4 liters NaOH | 2½ liters HCl | 2 liters saturated NaCl |
| MB5 | 4 liters NaOH | 2½ liters HCl | |
| SB3 | 2½ liters HCl | 4 liters NaOH | 2 liters saturated NaCl |
| MB6 | 2½ liters HCl | 4 liters NaOH | |
| SB4 | 2½ liters HCl | 4 liters NaOH | 3 liters saturated NaCl |

*Regenerations carried out with the resins in the mixed form.

All the regenerants were injected at a rate of 0.5 gpm/ft³ per each individual resin which is equivalent to 0.25 gpm/ft³ for the two resins together. The displacement rinses were at the same flowrate and the final rinses were the same as the service flows.

The effluents from the regenerations were collected in two portions when both acid and caustic were used for a regeneration. Each regenerant and associate rinse were and bulked together and the resulting volume measured. The concentrations of chromium and zinc and other major ions, were also determined. With this information, and knowing the concentrations of chromium and zinc in the blowdown, together with the volume passed through the column during service, the percentage recoveries were calculated.

Tables No. 2 and 3 set out below, show the recovered percentages of chromium and zinc from the mixed and stratified bed regeneration. The sequence in which the regenerants were added and the amounts recovered from the individual stages are also shown.

TABLE NO. 2

| REGEN. No. | REGEN. Stage 1 | REGEN. Stage 2 | STAGE 1 $Cr^{6+}$ % RECOVERY | STAGE 2 $Cr^{6+}$ % RECOVERY | TOTAL $Cr^{6+}$ % RECOVERY | STAGE 1 $Zn^{2+}$ % RECOVERY | STAGE 2 $Zn^{2+}$ % RECOVERY | TOTAL $Zn^{2+}$ % RECOVERY |
|---|---|---|---|---|---|---|---|---|
| MB1F | NaOH | HCl | 83.8+ | 0.1+ | 83.9 | 11.2+ | 55.5+ | 66.7 |
| MB2F | NaOH | HCl | 88.4+ | 5.0+ | 93.4 | 17.1+ | 41.2+ | 58.3 |
| MB3F | NaOH | HCl | 75.4+ | 2.9+ | 78.3 | 9.4+ | 49.6+ | 59.0 |
| MB4F | NaOH | HCl | 84.5+ | 2.4+ | 86.9 | 10.0+ | 73.7+ | 83.7 |
| MB5 | NaOH | NCl | 87.0+ | 1.7+ | 88.7 | 8.3+ | 50.6+ | 58.9 |
| MB6 | HCl | NaOH | 0.1* | 63.9* | 64.0 | 37.3* | 1.7* | 39.0 |

F—These regenerations were carried out with the resins in the mixed form
+See FIG. 5
*See FIG. 6

TABLE NO. 3

Recovered percentage of Hexavalent Chromium and Zinc after the stratified bed regeneration.

| REGEN. No. | REGEN. STAGE 1 | REGEN. STAGE 2 | STAGE 1 $Cr^{6+}$ % | STAGE 2 $Cr^{6+}$ % | TOTAL $Cr^{6+}$ % | STAGE 1 $Zn^{2+}$ % | STAGE 2 $Zn^{2+}$ % | TOTAL $Zn^{2+}$ % |
|---|---|---|---|---|---|---|---|---|

TABLE NO. 3-continued
Recovered percentage of Hexavalent Chromium and Zinc after the stratified bed regeneration.

| | | | RECOVERY | RECOVERY | RECOVERY | RECOVERY | RECOVERY | RECOVERY |
|---|---|---|---|---|---|---|---|---|
| SB1 | NaOH | HCl | 84.3+ | 7.0+ | 91.3 | 5.6+ | 72.2+ | 77.8 |
| SB2 | NaOH | HCl | 103.7+ | 0.7+ | 104.4 | 9.8+ | 64.4+ | 74.2 |
| SB3 | HCl | NaOH | 0.3* | 80.2* | 80.5 | 56.1* | 3.7* | 59.8* |
| SB4 | NCl | NaOH | 0.2* | 49.2* | 49.4 | 38.7* | 1.4* | 40.1 |

+See FIG. 5
*See FIG. 6

The following points should be noted.

The lowest chromium and zinc recoveries were obtained from regenerations MB6, SB3 and SB4 when the acid preceded the caustic through the column and may, it is thought, be explained as follows.

Before reaching the lower TSAP-40 layer, the acid passed through the IRA-94 which had just completed a service run and was in the exhausted form. On passing through this layer, the acid picked up various impurities and reached the TSAP-40 in a contaminated state obviously less efficient than fresh acid. When the acid followed the caustic, the IRA-94 was already in the regenerated form and the acid converted it from the free base to the chloride form and reached the TSAP-40 relatively uncontaminated.

The caustic regenerant, as well as removing the chromium, also contained zinc after passing through the column and similarly, the acid contained chromium. The percentages of zinc in the caustic when it was the stage one regenerant ranged from 5.6 to 17.1% and the percentages of chromium in the acid when it was the stage one regenerant ranges from 0.1% to 0.3%. As all the recovered effluents would be returned to the cooling tower, the fact that some of the chromium and zinc were in the "wrong" regenerant is unimportant.

If the regenerations where the acid injection preceded the caustic injection were neglected the mean total hexavalent chromium recovery was 89.6% and the mean total zinc recovery was 68.4%.

Table 5 lists the amounts of major constituents recovered during regeneration by co-current regeneration. Techniques shown in FIGS. 5 and 6.

As many changes could be made in the various embodiments of the invention without departing from the scope of the invention, it is intended that all matter contained herein be interpreted as illustrative thereof, and not in a limiting sense.

The embodiments of the invention in which an exclusive property or privilege is claimed are as follows:

1. In a process for the selective recovery from effluent, of zinc and chromium in their ionic forms, by ion exchange, the step of passing the effluent through a fixed bed of anion exchange resin and cation exchange resin, in the same ion exchange vessel, the anion exchange resin being selective of chromium and the cation exchange resin being an intermediate acid cation exchange resin with a phosphonic acid functional group on a cross-linked polystyrene matrix having the repeating structural formula:

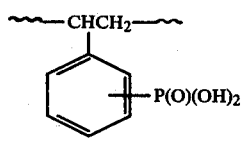

selective of zinc.

2. In the process of claim 1, wherein the pH of effluent is between about 4.5 and about 5.

3. In the process of claim 1 including the further step of regenerating the resins in the same vessel to recover the zinc and chromium in their ionic forms, and restore the resins to forms useful in ion exchange.

4. In the process of claim 3, wherein the pH of effluent is between about 4.5 and about 5.

5. In the process of claim 3 or 4, wherein the further step of regenerating is achieved using caustic soda and an acid used in co-current and counter current regeneration to restore the resins to useful forms in ion exchange.

6. In the process of claim 3 or 4, wherein the further step of regenerating is achieved by counter current application of an acid upwardly through the cation resin

TABLE NO. 5
MAJOR CONSTITUENTS IN GRAMS RECOVERED DURING REGENERATION

| | Regeneration Number | | | | | | | | | |
|---|---|---|---|---|---|---|---|---|---|---|
| | SB1 | SB2 | SB3 | SB4 | MB1* | MB2* | MB3* | MB4* | MB5 | MB6 |
| Sulphate | 18.71 | 17.78 | 17.66 | 12.56 | 25.09 | 26.58 | 25.7 | 21.06 | 23.77 | 14.93 |
| Chloride | 102.05 | 171.67 | 217.37 | 183.38 | 80.3 | 72.3 | 84.26 | 161.4 | 160.31 | 193.77 |
| Calcium | 7.41 | 8.08 | 8.76 | 12.56 | 100.72 | 7.17 | 7.54 | 7.55 | 6.78 | 8.53 |
| Magnesium | 3.24 | 3.32 | 3.75 | 4.98 | 24.05 | 2.7 | 1.80 | 2.91 | 2.71 | 4.88 |
| Sodium | 85.29 | 88.29 | 62.88 | | 14.74 | 88.5 | 82.87 | 83.76 | 83.68 | |
| Zinc | 1.7 | 1.96 | 2.37 | 2.26 | 1.61 | 1.47 | 1.28 | 2.1 | 2.35 | 2.11 |
| Hexavalent Chromium | 6.57 | 7.92 | 7.68 | 7.37 | 6.51 | 7.61 | 6.03 | 6.29 | 8.49 | 9.16 |
| Trivalent Chromium | 0.54 | 0.57 | 2.18 | 1.28 | 0.23 | 0.74 | 1.38 | 0.88 | 2.83 | 0.64 |
| Total Dissolved Solids | | 302.2 | 286 | 225.1 | | | | 283.6 | 270.9 | 222.9 |
| Volume of Blowdown Treated in Liters | 902 | 787 | 997 | 1875 | 886 | 940 | 902 | 787 | 997 | 1875 |

*These regenerations were carried out with the resins in the mixed form.

from the bottom of the vessel and removal at substantially the interface of the resins through a regenerant distributor followed by the passage of NaOH co-current through the resins from the top and collected at the bottom and then followed by the addition of acid from above the anion resin and removed at the regenerant distributor, the resins being rinsed with water between applications of caustic and acid.

7. In the process of claim 3 or 4, wherein the further step of regenerating is achieved by the passage of caustic through the resins and counter currently applying acid from the bottom through the cation resin and removing the acid through a sub-surface washer situate in the anion resin between the interface and the top of the anion resin, the resins being rinsed with water between applications of caustic and acid.

8. In the process of claim 3 or 4, wherein the further step of regenerating is achieved by the counter current application of acid from the bottom through the cation resin and removing the acid through a sub-surface washer situate in the anion resin between the interface and the top of the anion resin and passing the caustic through the resins, the resins being rinsed with water between the application of caustic and acid.

9. In the process of claim 3 or 4, wherein the further step of regenerating is achieved by the application of caustic and acid either co-currently or counter currently through the resins, the resins being rinsed between application of the caustic and resin.

10. In the process of claim 3, wherein the further step of regenerating is achieved by way of mixed bed, co-current or counter-current regeneration and any combination thereof.

11. In the process of claim 3, wherein the further step of regenerating is achieved by mixed bed regeneration.

12. In the process of claim 3, wherein the further step of regenerating is achieved by co-current regeneration.

13. In the process of claim 3, wherein the further step of regenerating is achieved by counter-current regeneration.

14. In the process of claim 3, wherein the further step of regenerating is achieved by a combination of co-current and counter current regeneration.

15. In the process of claim 1, wherein the anion exchange resin is in the Cl$^-$ form and the cation exchange resin is in the Na$^+$ form.

16. In the process of claim 1, wherein the anion exchange resin is in the free base form and the cation is in the Na$^+$ form.

17. In the process of claim 1, wherein the anion exchange resin is in the free base form and the cation exchange resin is in the H$^+$ form.

18. In the process of claim 1, wherein the anion exchange resin is in the Cl$^-$ form and the cation exchange resin is in the H$^+$ form.

19. A process for the selective recovery of zinc and chromium in their ionic forms from effluent, including the steps of combining an intermediate acid, cation exchange resin with phosphonic acid functional group on a cross-linked polystyrene matrix, having the repeating structural formula:

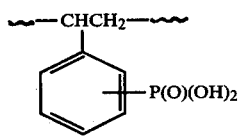

with an anion exchange resin selective of, or having an affinity for, chromium in its ionic forms in a fixed bed in a single vessel, passing effluent containing chromium and zinc in their respective ionic forms therethrough and regenerating the resins into their useful forms, in the same vessel.

20. The process of claim 19, wherein the regeneration of the resins into their useful form is accomplished by acid and caustic.

21. The process of claim 19 or 20, wherein the pH of effluent passed through the cations is between about 4.5 and about 5.

22. The process of claim 19, wherein the anion resin is a tertiary amine resin.

23. The process of claim 20 of 22, wherein the step of regenerating is achieved by counter current appliation of an acid upwardly through the cation resin from the bottom of the vessel and removal at substantially the interface of the resins through a regenerant distributor followed by the passage of caustic co-current through the resins from the top and collected from the bottom and then followed by the addition of acid from above the anion resin and removed at the regenerant distributor, the resins being rinsed with water between applications of caustic and acid, and being backwashed prior to regeneration.

24. The process of claim 20 or 22, the step of regenerating is achieved by the passage of caustic through the resins counter currently applying acid from the bottom through the cation resin and removing the acid through a sub-surface washer situate in the anion resin between the interface and the top of the anion resin.

25. The process of claim 20 or 22, wherein the step of regenerating is achieved by the counter current application of acid from the bottom through the cation resin and removing the acid through a sub-surface washer situate in the anion resin between the interface and the top of the anion resin and passing the caustic through the resins, the resins being rinsed with water between application of caustic and acid, and being backwashed prior to regeneration.

26. The process of claim 20 or 22, wherein the step of regenerating is achieved by the application of caustic and acid either co-currently or counter currently through the resins, the resins being rinsed between applications of the caustic and acid, and being backwashed prior to regeneration.

27. The process of claim 19, wherein the step of regenerating is achieved by any of mixed bed, co-current, or counter current regeneration techniques and any combination thereof.

28. The process of claim 19 or 20 wherein the step of regenerating is achieved by mixed bed regeneration techniques.

29. The process of claim 19 or 20, wherein the step of regenerating is achieved by co-current regeneration techniques.

30. The process of claim 19 or 20, wherein the further step of regenerating is achieved by counter-current regeneration techniques.

31. The process of claim 19 or 20, wherein the further step of regenerating is achieved by a combination of co-current and counter current regeneration techniques.

32. The process of claim 19 or 20, wherein the anion exchange resin is in the Cl$^-$ form and the cation exchange resin is in the Na$^+$ form.

33. The process of claim 19 or 20, wherein the anion exchange resin is in the free base form and the cation is in the Na$^+$ form.

34. The process of claim 19 or 20, wherein the anion exchange resin is in the free base form and the cation exchange resin is in the H$^+$ form.

35. The process of claim 19 or 20, wherein the anion exchange resin is in the Cl$^-$ form and the cation exchange resin is in the H$^+$ form.

* * * * *